(12) United States Patent
Kishida

(10) Patent No.: US 6,212,038 B1
(45) Date of Patent: Apr. 3, 2001

(54) SHUTTER MECHANISM FOR DISK CARTRIDGE

(75) Inventor: Hiroshi Kishida, Tokyo-to (JP)

(73) Assignees: Dai Nippon Printing Co., Ltd., Tokyo-to; Pioneer Video Corporation, Yamanashi-ken; Pioneer Electric Corporation, Tokyo, all of (JP)

( * ) Notice: Subject to any disclaimer, the term of this patent is extended or adjusted under 35 U.S.C. 154(b) by 0 days.

(21) Appl. No.: 09/650,376

(22) Filed: Aug. 29, 2000

Related U.S. Application Data

(62) Division of application No. 08/958,900, filed on Oct. 28, 1997, now Pat. No. 6,157,517.

(30) Foreign Application Priority Data

| Oct. 30, 1996 | (JP) | 8-288503 |
| Oct. 30, 1996 | (JP) | 8-288509 |
| Apr. 17, 1997 | (JP) | 9-100096 |
| Jun. 6, 1997 | (JP) | 9-149089 |

(51) Int. Cl.$^7$ ................................................ G11B 23/03
(52) U.S. Cl. ................................................ 360/133; 369/291
(58) Field of Search .......................... 360/133; 369/291; 206/308.1, 308.3, 309

(56) References Cited

U.S. PATENT DOCUMENTS

| 4,780,868 | * | 10/1988 | Vignal | 369/291 |
| 5,121,277 | * | 6/1992 | Ikebe et al. | 360/133 |
| 5,488,605 | * | 1/1996 | Ishimatsu | 369/291 |
| 5,793,742 | * | 8/1998 | Sandell et al. | 369/291 |

FOREIGN PATENT DOCUMENTS

| 0 142 411 | 5/1985 | (EP) . |
| 0 250 111 | 12/1987 | (EP) . |
| 0 260 876 | 3/1988 | (EP) . |
| 0 271 997 | 6/1988 | (EP) . |
| 0 442 502 | 8/1991 | (EP) . |
| 0 295 025 | 12/1998 | (EP) . |
| 2 275 810 | 9/1994 | (GB) . |
| 5-6758 | 1/1993 | (JP) . |
| 2508449 | 4/1996 | (JP) . |
| WO 97/25713 | 7/1997 | (WO) . |

* cited by examiner

Primary Examiner—William Klimowicz
(74) Attorney, Agent, or Firm—Merchant & Gould P.C.

(57) ABSTRACT

A slide mechanism for a shutter, installed on a cartridge case of a disk cartridge, which is slidable in both right and left directions relative to the cartridge case from a neutral position at which a head access opening is closed by the shutter, and which is constituted by a smaller number of components and easy to assemble. The case has a groove which forms between a pair of counterparts forming the case itself; the shutter is biased toward a neutral position at which the shutter closes the head access opening; and the shutter has a projecting part which slidably engages the groove. The shutter is divided by a connecting portion of the upper wall side shutter plate and the lower wall side shutter plate, and the shutter is fixed together after the shutter plates are assembled to the cartridge case.

17 Claims, 20 Drawing Sheets

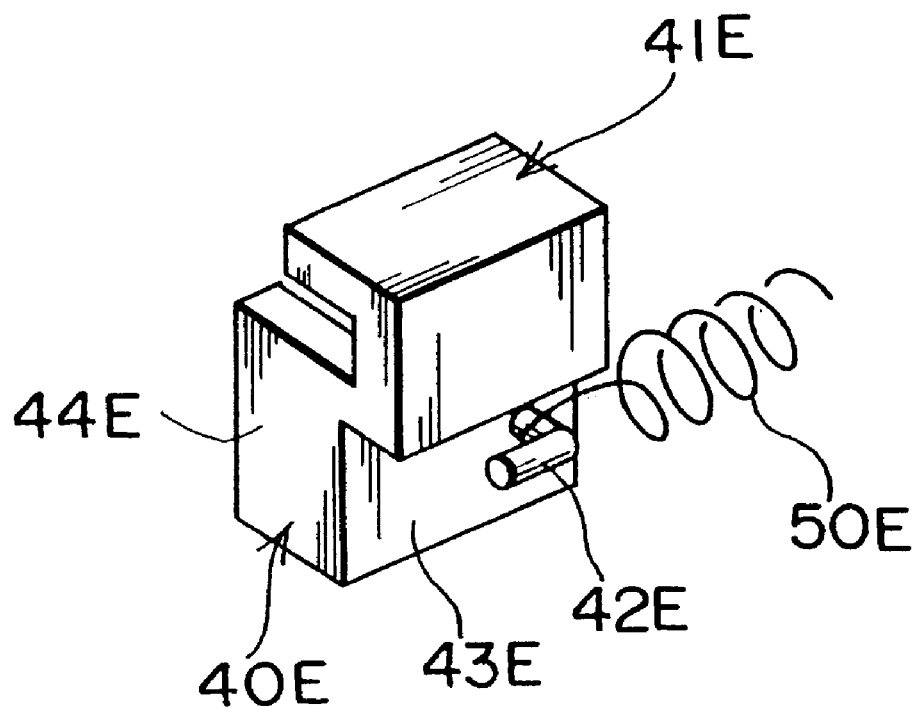

SHUTTER MECHANISM FOR DISK CARTRIDGE

This application is a divisional of application Ser. No. 08/958,900, filed Oct. 28, 1997, now U.S. Pat. No. 6,157,517, which application(s) are incorporated herein by reference.

BACKGROUND OF THE INVENTION

1. Field of the Invention

The present invention relates to a disk cartridge in which a disk-shaped recording medium such as an optical disk or a magnetic disk is housed rotatably relative thereto, and particularly relates to a shutter mechanism of the disk cartridge of a type in which a shutter thereof is slidable in both right and left directions from a neutral position at which a head access opening of the disk cartridge is closed by the shutter.

2. Description of the Related Arts

A cartridge case of a conventional disk cartridge, housing a disk-shaped recording medium such as a compact disk or the like therein, has a head access opening for access of a head. The head access opening is openable and closable by a shutter which is slidably mounted on a surface of the cartridge case. When the disk cartridge is loaded inside a disk drive system, the shutter of the disk cartridge is slid by a shutter drive pin of the disk drive system. This allows the shutter to open the head access opening so that the reading and/or writing relative to the disk-shaped recording medium is performed.

Meanwhile, there has been conventionally provided a disk cartridge which accommodates a disk-shaped recording medium that is readable and writable on both sides thereof, and which is possible to be set inside a disk drive system whichever either side thereof comes on top. In order to avoid any complication of the shutter drive mechanism on a side of the disk drive system, the shutter of the disk cartridge is so constructed as to be slidable in both right and left directions from a neutral position at which the head access opening is closed by the shutter, while the shutter drive pin of the disk drive system is so constructed as to be driven in one direction.

As this type of shutter mechanism, for example, Japanese Laid-Open Patent Publication No. 5-6758 discloses a disk cartridge with a shutter mechanism with the following construction.

That is, the disk cartridge has:
a shutter which is slidable relative to the cartridge case in which the shutter has a first slider able to be guided by a sliding groove, as guide means, that is formed on the cartridge case;
a stopper installed at a middle position relative to the cartridge case;
a pair of second sliders which are slidable on both sides of the stopper; and
a pair of torsion coil springs, as biasing means, which are mounted on both sides of the stopper and which bias the sliders inward to each other,
wherein the shutter has a pair of claws which are formed bent inward from a operational opening so that each claw contacts an inner surface of each second slider when both the second sliders contact the stopper.

With the mechanism, when the shutter is not driven by a disk drive system, the shutter remains at its neutral position with the shutter being biased to each other by the pair of torsion coil springs. On the other hand, when the shutter is slid, for example, in the right direction from the neutral position, the shutter is moved together with the right second slider in the right direction while the right torsion coil spring is being deformed or charged, whereas the left second slider remains stationary with the left second slider contacting the stopper. If the shutter is slid in the left direction, the operation is reversed.

According to the mechanism, the first slider of the shutter has only the function to guide the shutter relative to the cartridge case, but does not have the function to be biased or urged by the torsion coil spring as biasing means.

Meanwhile, as another shutter mechanism, there has been proposed a shutter mechanism (see Japanese Patent Publication No. 2508449 as a reference) with a pair of sliders which are able to slide on a metallic guide shaft. The guide shaft is arranged along a direction in which the shutter is slidable, and the pair of sliders are connected to each other with a tension coil spring. The shutter mechanism also has a stopper, formed centrally on the cartridge case, which contacts the pair of sliders from inside in which the stopper has a length that is greater than a free length of the tension coil spring. In the mechanism, the shutter has a pair of projecting parts that contact the two sliders from inside, respectively.

According to the mechanism, the shutter is normally held at the neutral position where the head access opening is closed by the shutter thus biased; on the other hand, the shutter is moved together with one of the sliders at time of sliding the shutter while the other of the sliders remains stationary.

Namely, the shutter mechanism according to the former prior art requires two torsion coil springs; and the shutter mechanism according to the latter related art requires a separate guide shaft, as components, respectively. In other words, the above shutter mechanisms require not a few assembling parts, thus leading to a high cost of production. In addition, shutter mechanism of the latter related art has another problem in which the shutter mechanism has to be assembled in such a way that the slider and shutter need to be first mounted on the separate guide shaft to form a subassembly and then the subassembly needs to be built on the cartridge case. That is, the assembling thereof is hard to perform.

SUMMARY OF THE INVENTION

Therefore, it is an object of the present invention to provide a disk cartridge, a shutter mechanism of which is constituted with a smaller number of assembling parts for easier assemblage and for prevention of high cost of production, the shutter being slidable relative to a cartridge case thereof from right to left with a neutral position at which the shutter closes a head access opening of the cartridge case.

In accomplishing this and other objects of the present invention, there is provided a disk cartridge comprising: a cartridge case which has an upper half-shell with an upper wall and a lower half-shell with a lower wall in which the cartridge case has a head access opening; a disk-shaped recording medium which is rotatably housed inside the cartridge case; a shutter which is slidable relative to the cartridge case in a sliding direction from right to left relative thereto with a neutral position therebetween corresponding to a position at which the shutter closes the head access opening; guide means which is provided on the cartridge case in the sliding direction; a first slider which is fixed to the shutter and which is guided by the guide means; and biasing means which exerts a biasing force upon the first slider so as to return the shutter to the neutral position when the shutter is moved to one of the right and left from the neutral position.

For example, in case of constructing the biasing means so that the biasing means is constituted by a pair of springs on both sides of the shutter so as to bias the shutter towards the neutral position, and in case of constructing the first slider so that the first slider is constituted by a single slider that is fixed to the shutter and that is guided by the guide means, a shutter mechanism being constituted with a smaller number of assembling parts for easier assemblage and for prevention of high cost of production is surely realized, in contrast with a former prior art (Japanese Laid-Open Patent No. 5-6758) in which a pair of coiled springs and a pair of sliders are used. That is, according to the mechanism, there is no need of two sliders.

Meanwhile, for example, in case of constructing the first slider so that the first slider is constituted by a single projection fixed to the shutter and in case of constructing the guide means so that the guide means is constituted by a groove that is defined between the upper half-shell and the lower half-shell and that is engaged with the single projection, a shutter mechanism being constituted with a smaller number of assembling parts for easier assemblage and for prevention of high cost of production is surely realized, in contrast with a latter prior art (Japanese Patent Publication No. 2508449) in which a guide rod made of metal is used. That is, according to the mechanism, there is no need of such a rod made of metal.

In the mechanism, the biasing means can further comprise: a pair of second sliders which are guided by the guide means, wherein one of the second sliders is arranged on one of a pair of sides of the first slider, and wherein the other of the second sliders is arranged on the other thereof of the first slider; spring means which attracts the pair of second sliders to each other; and a stopper, provided on the cartridge case, which has a pair of ends, wherein one of the ends is able to abut an inner surface of one of the second sliders, and wherein the other of the ends is able to abut an inner surface of the other of the second sliders from inside.

In the mechanism, the pair of second sliders and the stopper may be preferably so constructed that a position at which both the sliders contact the stopper corresponds to the neutral position of the shutter relative to the cartridge case.

In the mechanism, the guide means can comprise a first guide groove which a part of the upper wall and a part of the lower wall cooperate to form therebetween, wherein the first slider can comprise a projecting part which is slidable inside the first guide groove, wherein the second slider slidably engages the first guide groove, and wherein the shutter can comprise an upper shutter plate and a lower shutter plate, in which the upper shutter plate and the lower shutter plate are divided at a location where the upper shutter plate and the lower shutter plate are connected to each other, and in which the upper shutter plate and the lower shutter plate are integrated to each other after the upper shutter plate and the lower shutter plate are mounted on the cartridge case.

According to the mechanism, for example, when one of the second sliders contacts the projecting part of the first slider so as to bias the shutter towards the neutral position, and when both the second sliders contact the stopper, the projecting part thereof is positioned between the pair of second sliders so that the shutter closes the head access opening of the cartridge case. On the other hand, when the shutter is moved in either direction of the right or left from the neutral position relative to the cartridge case, the projecting part pushes one of the pair of second sliders in the corresponding direction, while the other of the pair of second sliders remains stationary with the other thereof being held by the stopper. Because the spring means attracts both the second sliders to each other, the shutter is returned to the neutral position relative to the cartridge case at time of releasing any force to keep the shutter at a position that does not correspond to the neutral position relative thereto.

Also, according to the mechanism, the first guide groove is formed inside the cartridge case instead of mounting a guide rod thereon, and single spring means such as a spring coil which attracts the two second sliders to each other is used instead of mounting a pair of separate spring coils at different locations inside the cartridge case which bias a pair of different sliders to each other from outside respectively. Therefore, it is possible to reduce the number of parts constituting a disk cartridge of a type in which the shutter thereof can be slid laterally from the neutral position relative to the cartridge case, thus realizing a low cost of production.

Also, according to the mechanism, because there is no need of constructing the shutter mechanism as a subassembly before the shutter mechanism is assembled relative to a body of the cartridge case; in other words, because the disk cartridge is easily accomplished first by simply mounting each part thereof on the body of the cartridge case and then by fixing the upper shutter plate and the lower shutter plate to each other, it is possible to carry out the work to assemble the disk cartridge relatively easily.

In the mechanism, the projecting part of the first slider may comprise a first projecting part and a second projecting part that is separate from the first projecting part, in which the first projecting part is formed on one of a pair of sides of the shutter in the sliding direction, and in which the second projecting part is formed on the other of the pair of sides of the shutter in the sliding direction.

In the mechanism, it is preferable that one of is the upper wall and the lower wall comprises a projecting portion on an inner side thereof in which the projecting portion is formed in parallel with the first guide groove, and wherein the second slider comprises a sliding surface which is slidable relative to the projecting portion.

With the mechanism, the sliding movement of the second slider with respect to the one of the upper wall and the lower wall of the cartridge case is stabilized. Also, because it is possible to assemble the disk cartridge with the sliding surface of the second slider contacting the projection portion, the efficiency to assemble the disk cartridge is enhanced.

In the mechanism, it is preferable that the second slider comprises a wedge-like projection which projects in a direction in which the second slider contacts the stopper, while the stopper comprises a cutout portion with which the wedge-like projection of the second slider engages, wherein the wedge-like projection and the cutout portion comprise complementary frictional surfaces which contact with each other, and wherein the complementary frictional surfaces contact each other with the complementary frictional surfaces being pressed with each other when the second slider contacts the stopper under a biasing force exerted by the spring means.

According to the mechanism, the complementary frictional surfaces, of the second sliders and the stopper, contact to each other with the complementary frictional surfaces thereof being pressed to each other, when the pair of second sliders are assembled to one of the upper half-shell and the lower half-shell at time of assembling and when the spring means are installed between the pair of second sliders. Therefore, the second sliders are stably assembled relative to the stopper, and dislocation or disengagement of the second sliders from the stopper is effectively prevented. That is, the construction devotes itself to the enhancement of assembling work.

In the mechanism, it is preferable that the second slider further comprises a wedge-like groove which is formed tapering between a body of the second slider and the wedge-like projection, in which a surface that forms the wedge-like groove is formed generally in the sliding direction and is formed so as to be tapered in a direction opposite the stopper, while the stopper comprises a wedge-like part which is complementary with the wedge-like groove, and wherein the surface of the wedge-like groove and a surface of the wedge-like part contact each other when the second slider contacts the stopper under the biasing force exerted by the spring means.

According to the mechanism, because the second slider is held by the stopper at time of assembling so that not only the complementary frictional surfaces of the second slider and of the stopper contact to each other but also the surface of the wedge-like groove and the surface of the wedge-like part contact each other when the second slider contacts the stopper under the biasing force exerted by the spring means, the stability for assembling the second slider relative to the stopper is more enhanced.

In the mechanism, it is preferable that the part of the lower wall comprises a plank-like wall which has a projecting part that projects inside and which has a second guide groove on a side opposite a side on which the plank-like wall projects, in which the second guide groove exists in the sliding direction, wherein the second slider has a groove inside which the projecting part of the plank-like wall is slidably mounted, and wherein the second slider has a claw which projects inside the groove thereof and which slidably engages the second guide groove of the plank-like wall.

According to the mechanism, because the second slider is mounted on the lower wall, with the projecting part of the lower wall being embraced inside the groove of the second slider in which the claw of the second slider slidably engaging the second guide groove of the plank-like wall of the lower wall, the second slider is prevented from disengaging or being dislocated from the projecting part of the lower wall.

In the mechanism, it is preferable that one of the upper wall and the lower wall comprises a second guide groove which exists in parallel with the first guide groove and which exists opposite the first guide groove relative to the one of the upper wall and the lower wall, and wherein one, of the upper shutter plate and the lower shutter plate, which corresponds to the one of the upper wall and the lower wall comprises a projecting portion which slidably engages the second guide groove.

According to the mechanism, because the shutter is slidably guided on both sides of the cartridge case, the sliding movement of the shutter with respect to the cartridge case is more stabilized.

In accomplishing the above objects, there is also provided a disk cartridge comprising: a cartridge case which has an upper half-shell with an upper wall and a lower half-shell with a lower wall in which the cartridge case has a head access opening; a disk-shaped recording medium which is rotatably housed inside the cartridge case; a shutter which is slidable relative to the cartridge case in a sliding direction from right to left relative thereto with a neutral position therebetween corresponding to a position at which the shutter closes the head access opening; guide means which is provided on the cartridge case in the sliding direction; a first slider which is fixed to the shutter and which is guided by the guide means; and biasing means which exerts a biasing force upon the first slider so as to return the shutter to the neutral position when the shutter is moved to one of the right and left from the neutral position, wherein the guide means comprises a guide groove which a part of the upper wall and a part of the lower wall cooperate to form therebetween, wherein the first slider comprises a projecting part which is slidable inside the guide groove, and wherein the shutter comprises an upper shutter plate and a lower shutter plate, in which the upper shutter plate and the lower shutter plate are divided at a location where the upper shutter plate and the lower shutter plate are connected to each other, and in which the upper shutter plate and the lower shutter plate are integrated to each other after the upper shutter plate and the lower shutter plate are mounted on the cartridge case.

By the way, in a disk cartridge comprising: a cartridge case which has an upper half-shell with an upper wall and a lower half-shell with a lower wall in which the cartridge case has a head access opening; a disk-shaped recording medium which is rotatably housed inside the cartridge case; a shutter which is slidable relative to the cartridge case in a sliding direction from right to left relative thereto with a neutral position therebetween corresponding to a position at which the shutter closes the head access opening; guide means which is provided on the cartridge case in the sliding direction; a first slider which is fixed to the shutter and which is guided by the guide means; and biasing means which exerts a biasing force upon the first slider so as to return the shutter to the neutral position when the shutter is moved to one of the right and left from the neutral position, if a pair of coiled spring, or the like, as the biasing means, are mounted on both sides of the shutter so as to bias the shutter towards the neutral position relative to the cartridge case, there is no need of providing the first slider relative to the cartridge case. Even if the disk cartridge is so constructed, the shutter is held at the neutral position relative thereto when the shutter is not operated. Also with the mechanism, it is realized to reduce the number of assembling parts for the disk cartridge and to reduce the cost of production. In case that the disk cartridge is so constructed, there may be provided click means, for positioning the shutter relative to the cartridge case, which comprises: a projection on one of the shutter and the cartridge case, and a concave, which engages the projection, on the other of the shutter and the cartridge case. In the mechanism, the holding force, of the shutter relative to the cartridge case, exerted by the click means, may be set to such a degree as one that is smaller than a force exerted by a pin for driving the shutter. With the mechanism, a careless opening of the head access opening of the cartridge case is effectively prevented.

In accomplishing the above objects, there is also provided the following disk cartridge.

That is, there is provided a disk cartridge comprising: a cartridge case which has an upper half-shell with an upper wall and a lower half-shell with a lower wall in which the cartridge case has a head access opening; a disk-shaped recording medium which is rotatably housed inside the cartridge case; a shutter which is slidable relative to the cartridge case in a sliding direction from right to left relative thereto with a neutral position therebetween corresponding to a position at which the shutter closes the head access opening; guide means which is provided on the cartridge case in the sliding direction; a first slider which is fixed to the shutter and which is guided by the guide means; and biasing means which exerts a biasing force upon the first slider so as to return the shutter to the neutral position when the shutter is moved to one of the right and left from the neutral position, wherein the biasing means further comprises: a pair of second sliders which are guided by the guide means, wherein one of the second sliders is arranged on one of a pair of sides of the first slider, and wherein the other of the second sliders is arranged on the other thereof of the first slider; spring means which attracts the pair of second sliders to each other; and a stopper, provided on the cartridge case, which has a pair of ends, wherein one of the ends is able to abut an inner surface of one of the second sliders, and wherein the other of the ends is able to abut an inner surface of the other of the second sliders from inside, wherein the guide means comprises a guide rail which is integrated with an inner surface of one of the upper wall and the lower wall in the sliding direction, wherein the first slider slidably engages the guide rail, and wherein the second slider slidably engages the guide rail.

According to the mechanism, for example, when one of the second sliders contacts the first slider so as to bias the shutter towards the neutral position, and when both the second sliders contact the stopper, the first slider is positioned between both the second sliders so that the shutter closes the head access opening of the cartridge case. On the other hand, when the shutter is moved in either direction of the right or left from the neutral position relative to the cartridge case, the first slider pushes one of the pair of second sliders in the corresponding direction, while the other of the pair of second sliders remains stationary with the other thereof being held by the stopper. Because the spring means attracts both the second sliders to each other, the shutter is returned to the neutral position relative to the cartridge case at time of releasing any force to keep the shutter at a position that does not correspond to the neutral position relative thereto.

Also, according to the mechanism, the guide rail is integrated with the cartridge case and is not prepared as a member that is separate from the cartridge case; and each second slider of the two is not separately biased by a separate spring means from both sides of the cartridge case, but each second slider is mutually biased by a single spring means from inside of the cartridge case. Therefore, in a type of a disk cartridge in which a shutter is able to slide in either direction of the right or left from the neutral position relative to the cartridge case, the reduction of the assembling parts for the disk cartridge is surely realized, thus realizing the low cost of production.

In the mechanism, it is preferable that the guide rail comprises: a rail part; and a leg part which connects the rail part with the inner surface of the one of the upper wall and the lower wall, wherein the rail part is generally provided at a location which corresponds to a center line with respect to a direction of thickness of the cartridge case, in which the rail part has a thickness that is equal to or less than a thickness of the disk-shaped recording medium, and wherein the leg part is provided at a location outside the head access opening of the cartridge case.

A head for reading/writing data of a disk driving system gains an access to the disk-shaped recording medium through the head access opening of the cartridge case. Therefore, with the above mechanism of the present invention, interference of the guide rail relative to the access of the head is surely prevented.

In the mechanism, it is preferable that the rail part of the guide rail has a square cross section.

With the mechanism, because a rotation of the first slider relative to the guide rail and a rotation of the second slider relative thereto are surely prevented. Consequently, with the mechanism, there is no need of providing special, separate means for preventing the rotation therebetween.

In the mechanism, it is preferable that the first slider and the guide rail are so constructed that the first slider can be mounted on the guide rail in a direction generally perpendicular to a direction in which the guide rail extends, and/or that there is formed a space between one of a pair of ends of the guide rail and one of a pair of sides, of the cartridge case, extending in a direction perpendicular to the sliding direction, in which one of the second sliders can pass the space, and wherein there is formed a space between the other of the pair of ends of the guide rail and the other of the pair of sides, of the cartridge case, extending in the direction perpendicular to the sliding direction, in which the other of the second sliders can pass the space, and wherein the second slider has an engaging part which allows the second slider to be mounted on the guide rail in the sliding direction.

According to the mechanism, the work to mount the first and/or second slider(s) on the guide rail is facilitated.

Also, according to the mechanism, the spring means can be easily mounted on the second sliders before and after the second sliders are mounted on the guide rail.

Thus, with the mechanism, there is no need of preparing these parts as a subassembly beforehand, it is easy to assemble the disk cartridge.

In the mechanism, there may be further provided a retention part which is formed on an inner surface of the other of the upper wall and the lower wall in which the retention part constitutes an extension of the guide rail that corresponds to the space therebetween; and/or there may be further provided engaging means which makes the first slider and the second slider engage each other with the first slider and the second slider contacting each other, wherein the engaging means may comprise: a concave part which is provided on a contacting surface of one of the first slider and the second slider, and a convex part, able to engage the concave part, which is provided on a contacting surface of the other of the first slider and the second slider.

With the mechanism, it is possible to prevent a dislocation or disengagement of the second slider from the guide rail, even if the second slider is slid from the neutral position up to a position at which the second slider is disengaged from the guide rail as the shutter is forcibly moved from the neutral position.

In the mechanism, the second slider may have an engaging concave part which allows the second slider to be mounted on the guide rail in a direction perpendicular to the sliding direction, wherein the engaging concave part is defined inside an elastic hook-shaped part which is a part of the second slider.

With the mechanism, it is realized to facilitate the mounting of the second slider onto the guide rail.

In the mechanism, it is preferable that the elastic hook-shaped part comprises a tip part which has a guide sloping surface for assisting to mount the second slider onto the rail part of the guide rail.

With the mechanism, the mounting of the second slider onto the guide rail can be done more easily.

BRIEF DESCRIPTION OF THE DRAWINGS

This and other objects and features of the present invention will become clear from the following description taken in conjunction with preferred embodiments thereof with reference to the accompanying drawings, in which:

FIG. 21 is a perspective view of a modification of an engaging pin which is provided on the slider of the first embodiment;

DETAILED DESCRIPTION OF THE INVENTION

Figure 1:
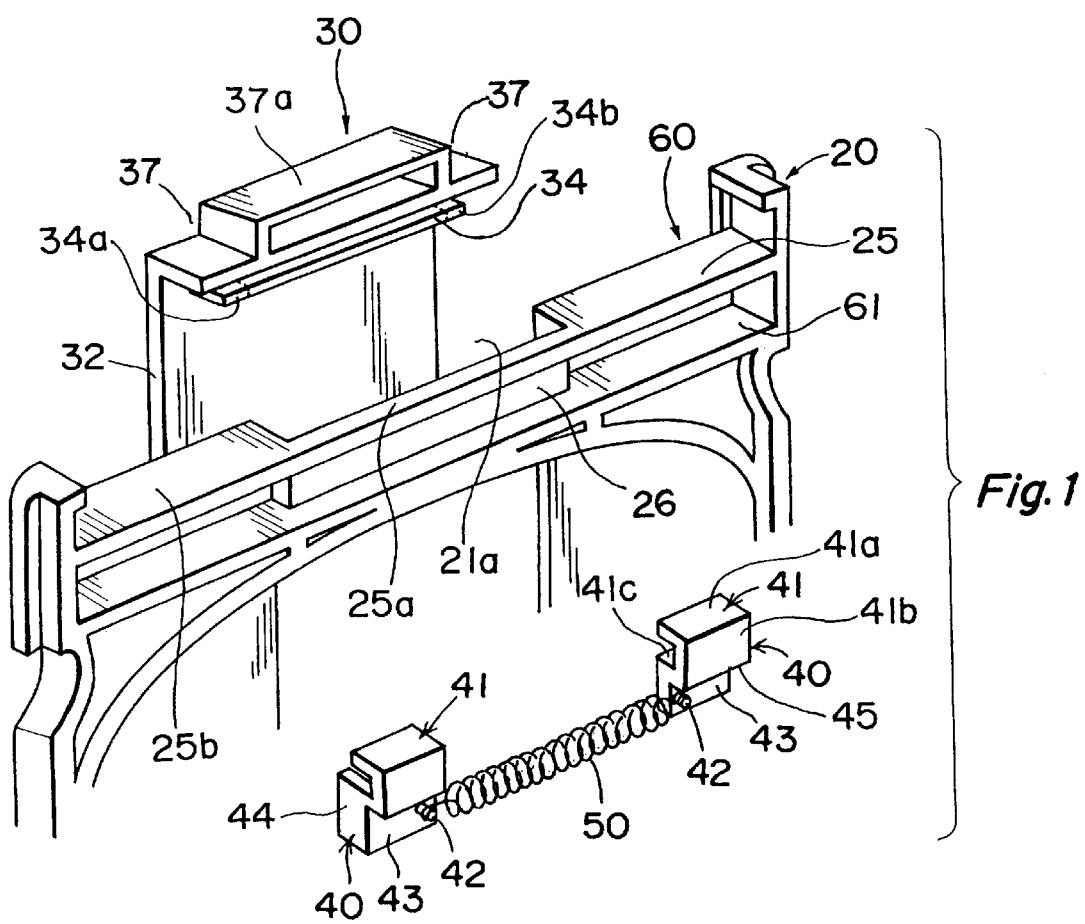
FIG. 1 is a partly exploded perspective view of a disk cartridge according to a first embodiment of the present invention.

Before the description of the present invention proceeds, it is to be noted that like or corresponding parts are designated by like reference numerals throughout the accompanying drawings.

Hereinafter, a first embodiment and a second embodiment of the present invention are described below in detail with reference to FIGS. 1 to 33.

First, a disk cartridge according to the first embodiment is described below with reference to FIGS. 1 through 9, 11 and 12.

The disk cartridge illustrated in the figures, has a quadrangular, thin-plate-shaped, hollow cartridge case in which a digital video disk (DVD) is rotatably housed as a disk-shaped recording medium. The cartridge case is so constructed that a half-shell on a side of an upper wall (hereinafter also referred to as an "upper wall side half-shell" (side A)), and a half-shell on a side of a lower wall (hereinafter also referred to as a "lower wall side half-shell" (side B)), which are both plastic molded and equal in thickness to each other, are overlaid on each other.

Figure 2:
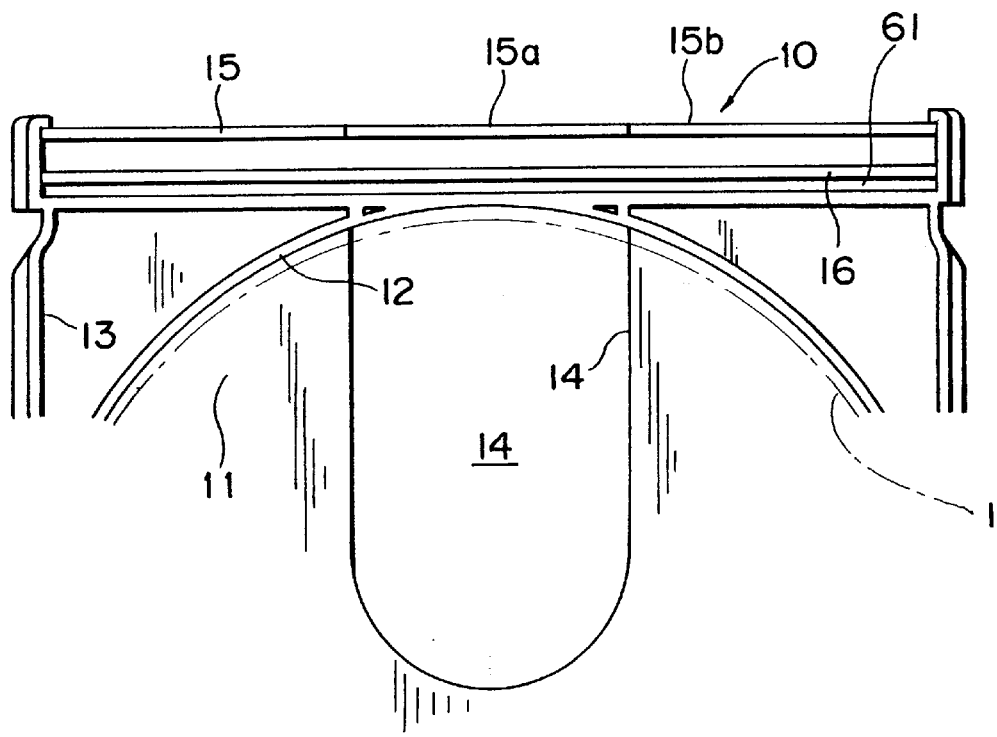
FIG. 2 is a partial inside view of a half-shell on a side of an upper wall of the disk cartridge shown in FIG. 1.
Figure 3:
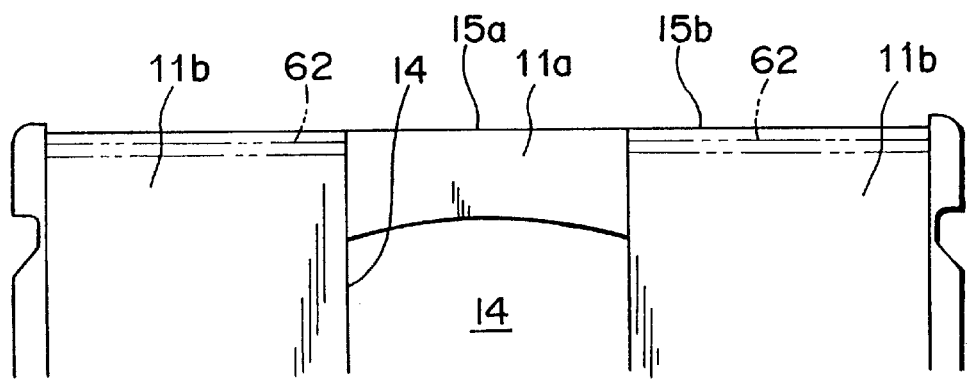
FIG. 3 is a partial top view of the half-shell of FIG. 2.
Figure 4:
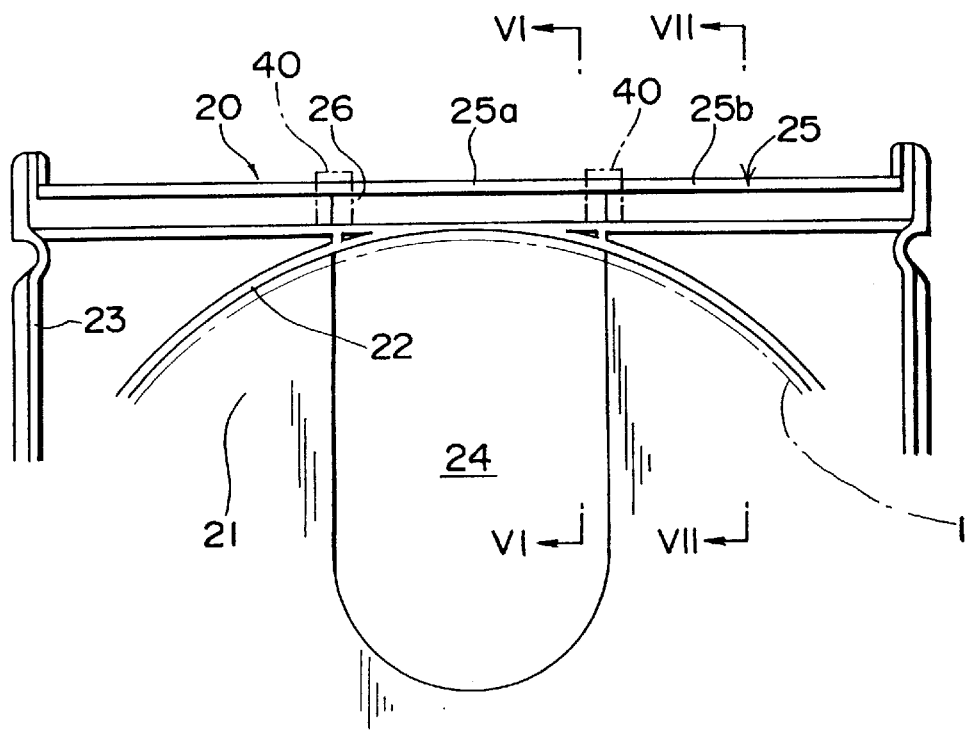
FIG. 4 is a partial inside view of a half-shell on a side of a lower wall of the disk cartridge shown in FIG. 1.
Figure 5:
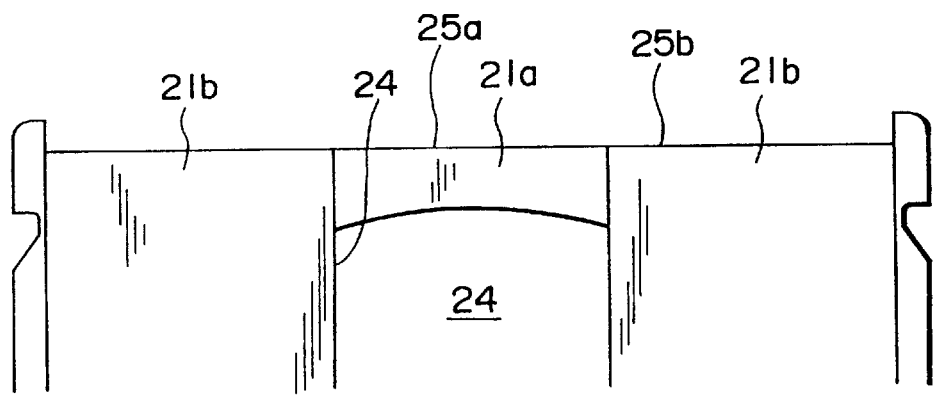
FIG. 5 is a partial top view of the half-shell of FIG. 4.
Figure 6:
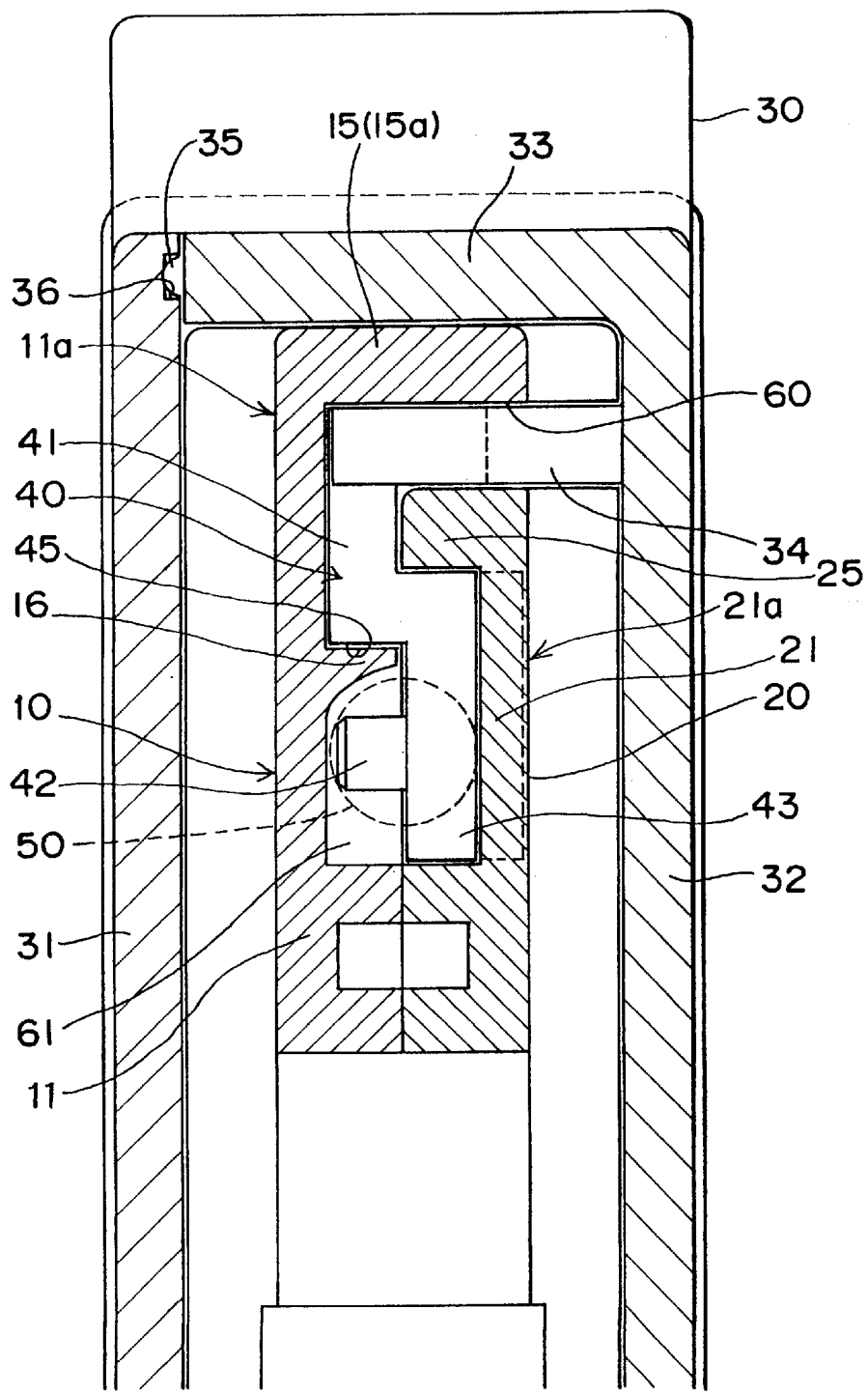
FIG. 6 is a sectional view taken along the line VI—VI of FIG. 4 in a state in which both shells and a shutter mechanism are assembled together.
Figure 7:
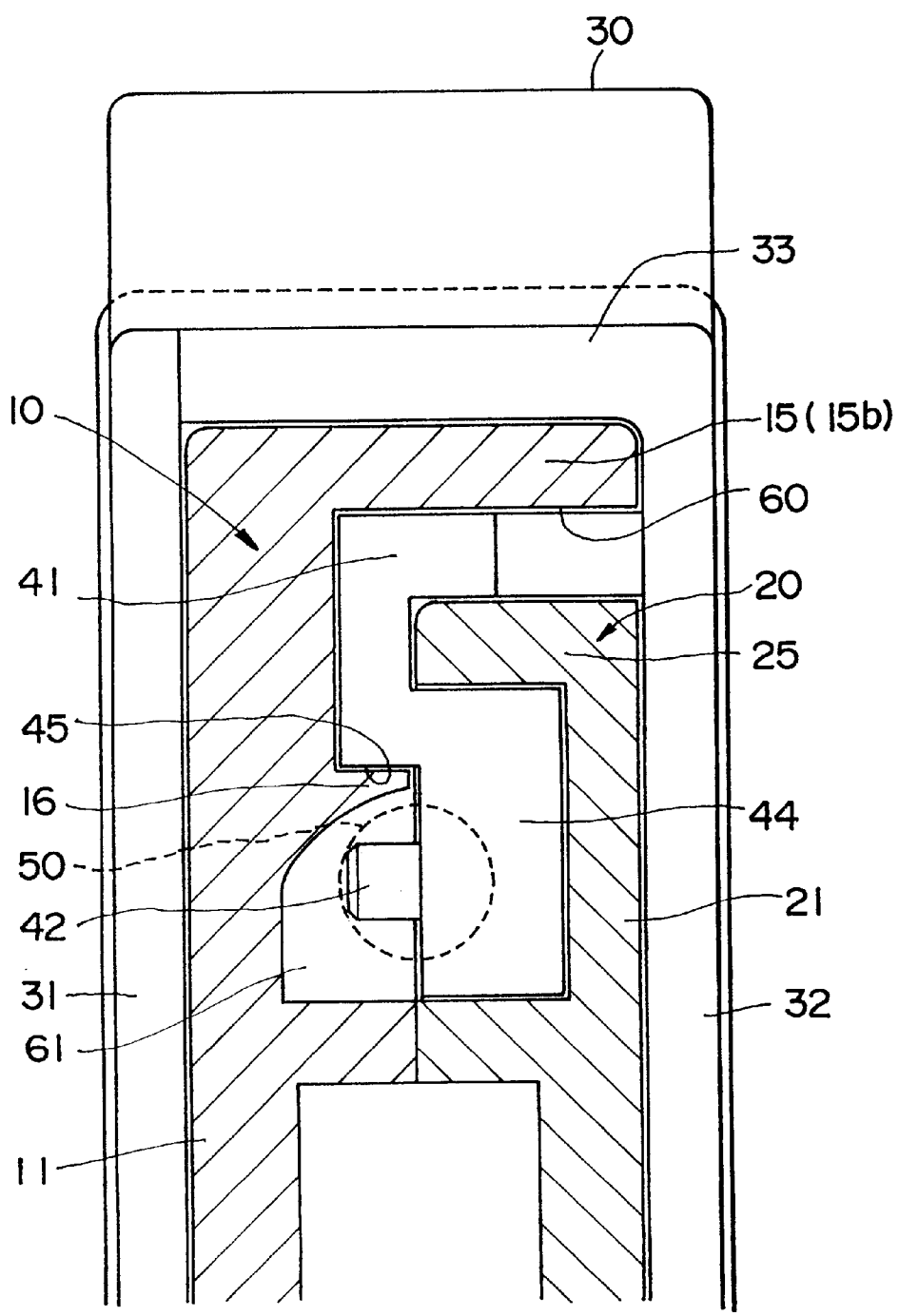
FIG. 7 is a sectional view taken along the line VII—VII of FIG. 4 in a state in which both shells and the shutter mechanism are assembled together.
Figure 8:
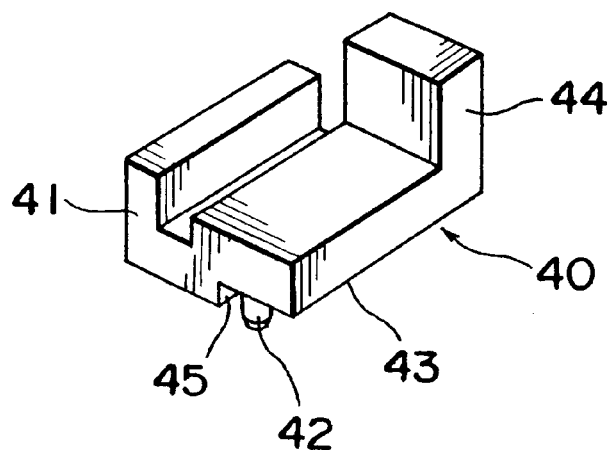
FIG. 8 is a perspective view of a left side slider of the disk cartridge shown in FIG. 1.
Figure 9:
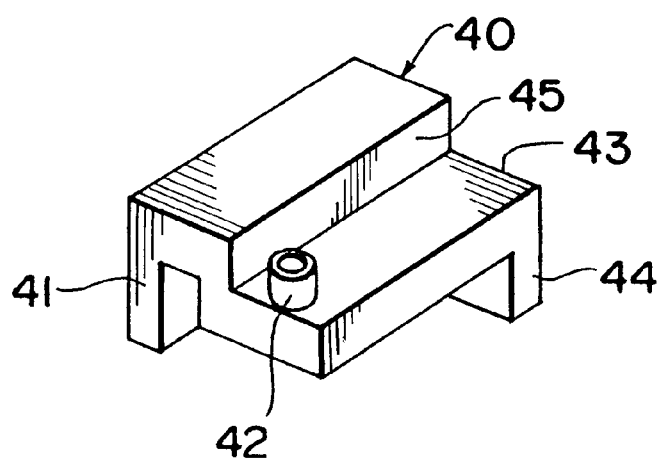
FIG. 9 is a perspective view of a right side slider of the disk cartridge shown in FIG. 1.

FIG. 1 is a partly exploded perspective view of the disk cartridge; FIG. 2 is a partial inside view of a half-shell on a side of an upper wall of the disk cartridge shown in FIG. 1; FIG. 3 is a partial top view of the half-shell of FIG. 2; FIG. 4 is a partial inside view of a half-shell on a side of a lower wall of the disk cartridge shown in FIG. 1; FIG. 5 is a partial top view of the half-shell of FIG. 4; FIG. 6 is a sectional view taken along the line VI—VI of FIG. 4 in a state in which both shells and a shutter mechanism are assembled together; FIG. 7 is a sectional view taken along the line VII—VII of FIG. 4 in a state in which both shells and the shutter mechanism are assembled together; FIG. 8 is a perspective view of a left side slider of the disk cartridge shown in FIG. 1; and FIG. 9 is a perspective view of a right side slider of the disk cartridge shown in FIG. 1.

In the figures, a reference numeral 10 denotes the half-shell on the upper wall side, 20 denotes the half-shell on the lower wall side, 30 denotes a shutter, made of plastic, of the shutter mechanism, 40 denotes sliders (a left side slider and a right side slider), and 50 denotes a spring. The upper wall side half-shell 10 and the lower wall side half-shell 20, are basically identical in configuration to each other except a portion constituting a guide groove, as described below, for sliding the shutter 30. Peripheral walls 12, 22 defining a disk-housing space, and side walls 13, 23 extending along side edge portions of an upper wall 11 and a lower wall 21, are formed integrally with the upper wall side half-shell 10 and the lower wall side half-shell 20, respectively. The two shells 10, 20 are provided with head access openings 14, 24 which forms in a direction in which the disk cartridge is loaded to a disk drive (not shown) upward from the central portions of the upper wall 11 and the lower wall 21. These openings 14, 24 are covered with the shutter 30, and the shutter 30 is adapted to be slid to both right and left from a neutral position where the shutter 30 covers the openings 14, 24.

The two shells 10, 20 differ from each other in the position of their upper-end walls 15, 25, so that when the two shells 10, 20 are connected to each other, a guide groove 60 extending along an opening/closing direction of the shutter is formed on the lower wall 21 side between the two upper-end walls 15, 25 (see FIGS. 6, 7). Namely, both the two upper-end walls 15, 25 cooperate with each other to form the guide groove 60.

Central portions 15*a*, 25*a* of the two upper-end walls 15, 25, i.e., portions corresponding to the width of the head access openings, are smaller in the thickness of the cartridge case than that of the other portions 15*b*, 25*b*, and they are equal to or smaller than the thickness of the disk-shaped recording medium so as not to disturb or interfere the running of the head during access of the head to the disk 1 (i.e. disk-shaped recording medium) with the disk drive being loaded with the disk cartridge. Correspondingly to this, surfaces of the upper wall 11 and the lower wall 21 are so formed that central portions 11*a*, 21*a* of their upper end portions are recessed relative to the left and right portions 11*b*, 21*b* thereof. In the cartridge case, a slider/spring guide space 61 forms inside the cartridge case so as to communicate with the guide groove 60 when the two shells 10, 20 are combined together.

The shutter 30 comprises a shutter plate 31 on a side of the upper wall (hereinafter also referred to as an "upper wall side shutter plate"), and a shutter plate 32 on a side of the lower wall (hereinafter also referred to as a "lower wall side shutter plate") which is connected to the upper wall side shutter plate 31 by a connecting plate 33. The connecting plate 33 forms into a U-shape in cross section and fitted to the cartridge case so as to sandwich the upper wall 11 and the lower wall 21 thereof. The shutter 30, having a projecting shape or appearance as viewed from the front side thereof as shown in FIG. 1, has recessed portions 37, 37 formed on its right and left shoulder portions. These recessed portions 37, 37 are used to open the shutter 30 by being engaged with a shutter drive pin when the disk cartridge is loaded to the disk drive.

The lower wall side shutter plate 32 and the connecting plate 33 are integrally molded as an L-shaped member, while the upper wall side shutter plate 31 is fixed to an end face of the connecting plate 33. The lower wall side shutter plate 32 has a projecting part 34 which is slidably fitted to the guide groove 60 of the cartridge case. By the way, the projecting part 34 of the shutter 30 may be formed as a first projecting part 34*a* with a narrow width arranged on one side of the shutter 30, and as a second projecting part 34*b* with a narrow width arranged on the other side of the shutter 30, respectively, as shown by an imaginary line in FIG. 1.

Meanwhile, in order that the upper wall side shutter plate 31 and the connecting plate 33 are integrated after being assembled to the cartridge case, a positioning projection 35 is formed at an end face of the connecting plate 33, while a positioning recess 36 is formed in the upper wall side shutter plate 31. The upper wall side shutter plate 31 and the connecting plate 33 can be fixed, for example, by ultrasonic welding after the positioning projection 35 is inserted into the positioning recess 36.

Between the upper wall side half-shell 10 and the lower wall side half-shell 20, is formed a guide space (groove) 61 for guiding the sliders 40, 40 and the spring 50. Each of the two sliders 40, 40 housed in this guide space 61 has, on the upper end portion as shown in FIG. 1, an engaging portion 41 which slidably engages the guide groove 60. The two engaging portions 41, 41 are arranged on both right and left sides of the shutter 30 so as to sandwich the projecting part 34 of the shutter 30 (see FIG. 11) therebetween.

Also, each of the sliders 40, 40 (the left side slider shown in FIG. 8 and the right side slider shown in FIG. 9 are symmetrical with respect to the shutter 30) has a positioning portion 43 provided with a pin 42 for supporting a tension coil spring 50. The tension coil spring 50 is coupled with the spring locking pins 42, 42 so that the two sliders 40, 40 are biased so as to attract each other. In addition, each engaging portion 41 of the sliders 40, 40 is constituted by an upper wall 41*a* and a side wall 41*b*.

Among these upper wall 41*a*, side wall 41*b* and positioning portion 43, is formed a groove 41*c* to which the upper-end wall 25 of the lower wall side half-shell 20 engages. Preferably, the pins 42, 42 are L-shaped as shown as a modification in FIG. 21 in order that end portions of the spring 50 are not easily disengaged or dislocated. In this modification, components or parts corresponding to those of the slider shown in the first embodiment are designated by the reference numerals used in the first embodiment and suffixed by an alphabetical character, "E".

Each positioning portion 43 of the two sliders 40, 40 has a convex portion or a projecting portion 44 that projects in a direction opposite to the pin 42 which engages the spring 50. And, on the lower wall side half-shell 20 of the cartridge case, is formed a stopper 26 that contacts an inner surface of the projecting portion 44 of each of the sliders 40, 40, so that when the sliders 40, 40 are positioned relative to the stopper 26 with the projecting portions 44, 44 of the sliders 40, 40 contacting the stopper 26 of the cartridge case, the shutter 30 comes to the neutral position relative to the cartridge case, thus causing the head access openings 14, 24 of the cartridge case to be closed.

By the way, the stopper 26 which is a projection for limiting the running or movement of the sliders 40, 40 relative to the cartridge case, may be formed on the upper wall side half-shell 10 so as to contact the engaging portions 41, 41 of the sliders 40, 40.

Furthermore, there is provided a projection streak 16 which extends in parallel with the guide groove 60. The projection streak 16 forms on the upper wall side half-shell 10 of the cartridge case, the bottom surface (or inner surface) of the projection streak 16 forming circular so as not to interfere the tension coil spring 50. Each of the sliders 40, 40 has a sliding surface 45 which slidably contacts with the upper surface of the projection streak 16.

In the above arrangement, the disk cartridge can be assembled by arranging the lower wall side shutter plate 32 of the shutter 30 on the surface of the lower wall side half-shell 20 so that the projecting part 34 engages the guide groove 60, by arranging the pair of sliders 40, 40 on the lower wall side half-shell 20 and connecting both ends of the spring 50 to the pair of pins 42, 42 of the two sliders 40, 40, by thereafter fixing the shells 10, 20 to each other, and by fixing the upper wall side shutter plate 31E to the connecting plate 33.

Figure 11:
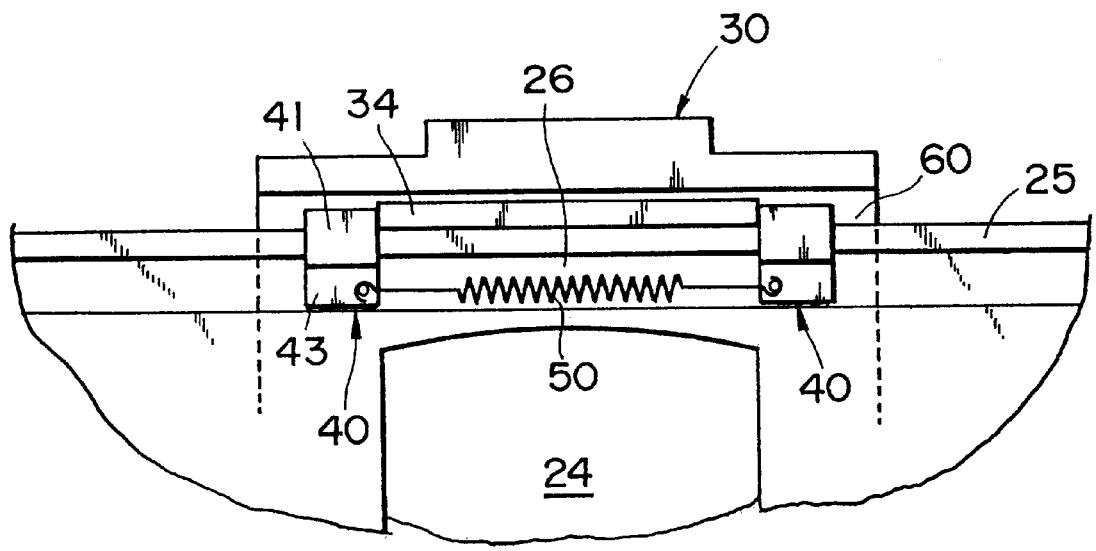
FIG. 11 is an explanatory view for explaining a motion of the sliders of the first embodiment, showing a state in which the shutter is at the neutral position.
Figure 12:
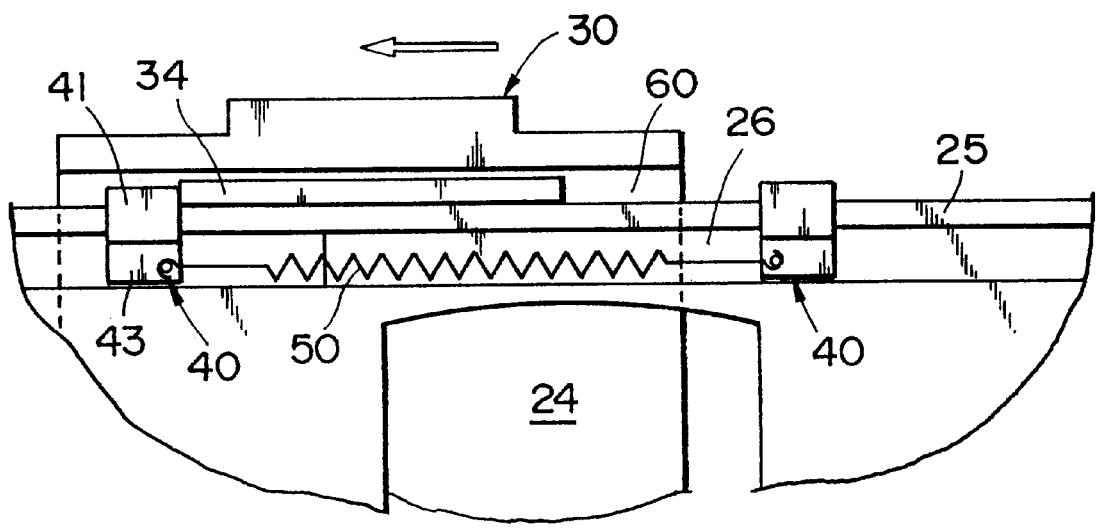
FIG. 12 is an explanatory view for explaining the motion of the sliders of the first embodiment, showing a state in which the shutter is moved to the left.

With the disk cartridge assembled in this way, as shown in FIGS. 11 and 12, the pair of sliders 40, 40 are in contact with the projecting part 34 of the shutter 30 from both the right and left sides (see FIG. 11), while the sliders 40, 40 are positioned by the stopper 26 formed on the cartridge case, so that the projecting part 34 of the shutter 30 is positioned at the center of the guide groove 60, and so that the shutter 30 comes to the neutral position, thus causing the head access openings 14, 24 to be closed. By the way, the stopper 26 contacts with the inner surface of the projecting portion 44 of each slider 40.

Meanwhile, when the shutter 30 is slid from the neutral position to either right or left direction (FIG. 12 shows a state in which the shutter 30 is moved in the left direction), the projecting part 34 of the shutter 30 moves together with one, of the sliders 40, 40, which is being pushed by the projecting part 34 of the shutter 30. During this movement, the other of the sliders 40 is held stationary in position by the stopper 26 so that the tension coil spring 50 is stretched. The two sliders 40, 40 are attracted to each other by the tension coil spring 50; therefore, if releasing the force to keep the shutter 30 at a position in which the shutter opens, the shutter 30 returns to the neutral position.

In the above arrangement, since the components or parts thereof can be easily assembled to the shells without need of arranging the shutter mechanism in the form of a sub-assembly beforehand, the assembling of the disk cartridge can be done conveniently. Further, since only one spring is used, and since no metallic parts are used, it is possible to realize a reduction of its production cost and, and to realize a lightweight disk cartridge Next, a modification shown in FIG. 10 is described below.

In this modification, components or parts corresponding to those of the disk cartridge of the first embodiment are designated by the reference numerals used in the first embodiment and suffixed by an alphabetical character, "A".

Figure 10:
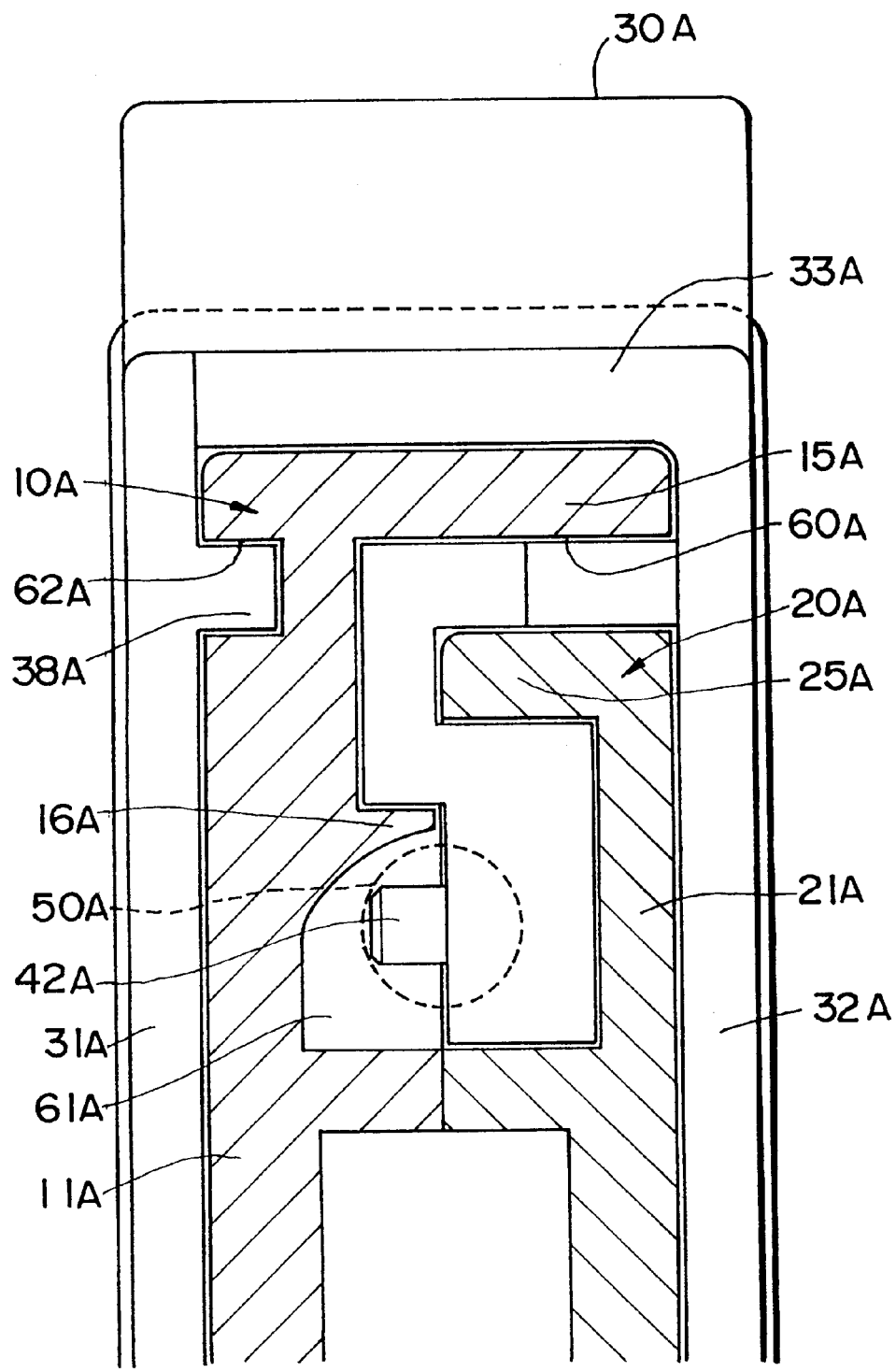
FIG. 10 is a sectional view of a modification of FIG. 7.

FIG. 10 is a view corresponding to FIG. 7 of the first embodiment. In this example, a second guide groove 62A, which is parallel to the guide groove 60A, is formed on a surface of an upper wall 11A, in which the second guide groove 62A is formed opposite to the guide groove 60A with respect to the upper wall 11A. And a second projecting part 38A that slidably fits to the second guide groove 62A is formed on an inner surface of the upper wall side shutter plate 31A.

As described above, the central portion of the upper wall 11A (a portion corresponding to 11a of the first embodiment) is recessed relative to both the right and left side portions (portions corresponding to 11b of the first embodiment). Accordingly, the second guide groove 62A is formed only on the right and left side portions (portions corresponding to 11b of the first embodiment) as indicated by imaginary lines in FIG. 3. Alternatively, the second guide groove 62A may be formed continuously so as to cover the central portion (a portion corresponding to 11a of the first embodiment) from the right and left portions.

Providing the second guide groove 62A makes it possible to guide the shutter 30A relative to the cartridge case more stably, with both sides of the shutter being guided by both sides of the cartridge case.

Next, three modifications of sliders and stoppers are described below with reference to FIGS. 13, 14, 15, FIGS. 16, 17, 18 and FIGS. 22, 23.

In these modifications, components or parts corresponding to those of the disk cartridge of the first embodiment are designated by the reference numerals used in the first embodiment, and suffixed by an alphabetical character, "B", "C" or "F", respectively.

Figure 13:
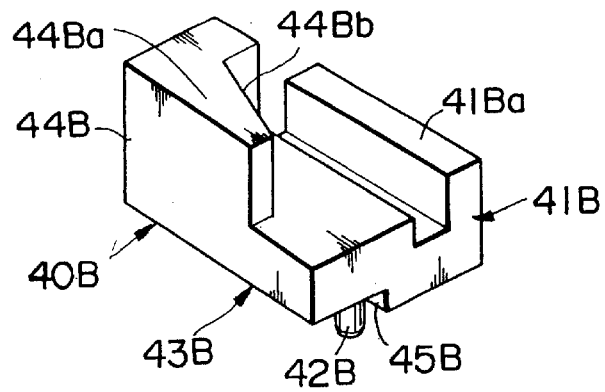
FIG. 13 is a perspective view of a slider according to a modification of slider of the first embodiment.

As shown in FIG. 13, this slider 40B has the same basic constitution as that of the first embodiment. That is, the slider 40B comprises a positioning portion 43B provided with a spring locking pin 42B, an engaging portions 41B and a projecting portion 44B. A characteristic of the modification is that a frictional projection 44Ba is formed on an inner surface of the projecting portion 44B. This frictional projection 44Ba has a tilted frictional surface 44Bb.

Figure 15:
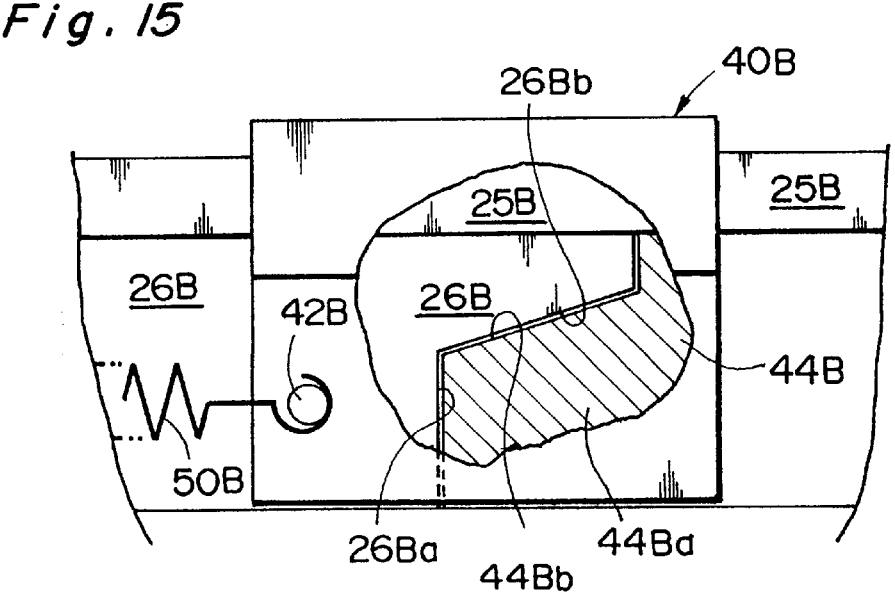
FIG. 15 is a main-part front view of the state in which the slider of FIG. 13 is assembled to the half-shell on the side of the lower wall.

On the other hand, on a corresponding end portion of the stopper 26B that engages the slider 40B, as shown in FIG. 15, is formed a cutout 26Ba which is so shaped as to accept the frictional projection 44Ba of the slider 40B. Further, on this cutout 26Ba, a tilted frictional surface 26Bb corresponding to the tilted frictional surface 44Bb is formed. These frictional surfaces 44Bb, 26Bb are tilted with respect to the direction of the sliding movement. Accordingly, when the shutter 30B is in the neutral position, as shown in FIG. 15, the slider 40B, is biased in the left direction in the figure so that the frictional projection 44Ba of the slider 40B is contacted with the cutout 26Ba of the stopper 26B. In this state, the frictional surfaces 44Bb, 26Bb of the frictional projection 44Ba and the cutout 26Ba are both tilted; therefore, the frictional projection 44Ba bites into the cutout 26Ba like a wedge so that their frictional surfaces are brought into close contact to each other.

Figure 14:
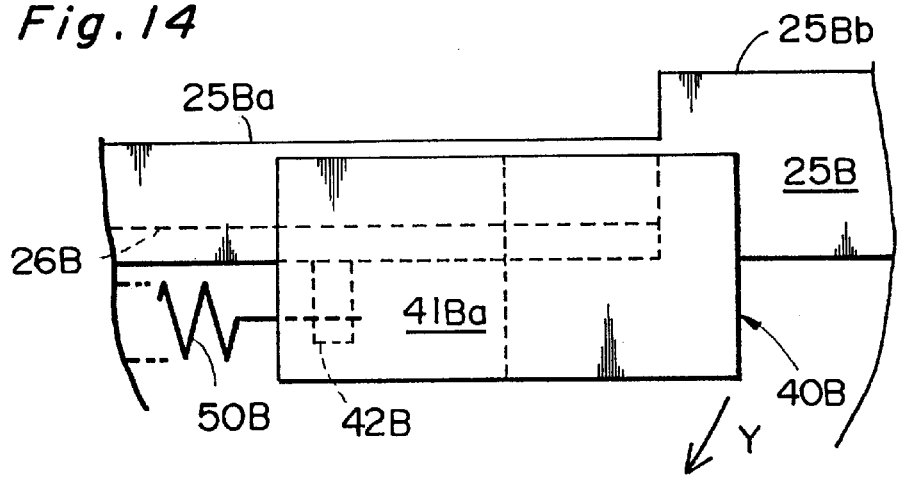
FIG. 14 is a main-part plan view of a state in which the slider of FIG. 13 is assembled to the half-shell on the side of the lower wall.

In addition, as shown in FIG. 14, the sliders 40B, 40B are exerted upon with the biasing force of the coil spring 50B. Therefore, the slider tends to be rotated in a direction shown by an arrow Y in the figure. As a result, with the structure of the sliders and the stopper according to the first embodiment, the sliders may happen to be disengaged or dislocated from the guide groove 60 and the upper-end wall 25 in the assembling process, which incurs a disadvantage of poor assembling efficiency.

By contrast, according to the modification of FIGS. 13, 14, 15, even if such a rotating force in the direction of arrow Y is exerted upon the sliders, the frictional force exerting between the two frictional surfaces is a resistance to the rotation thereof. That is, because the position and posture of the sliders are kept stationary and stable relative thereto, the assembling work of the sliders get more efficient and advantageous.

Figure 16:
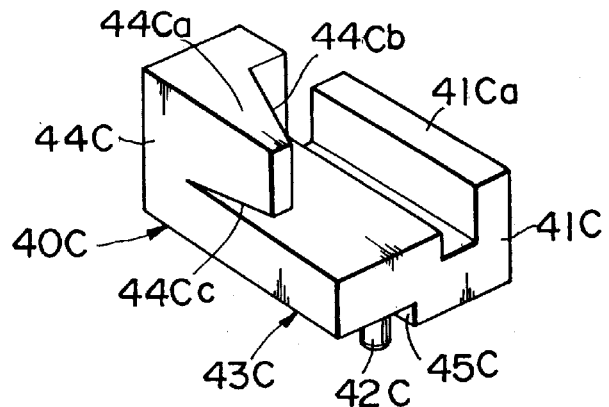
FIG. 16 is a perspective view of a slider of another modification of slider of the first embodiment.
Figure 17:
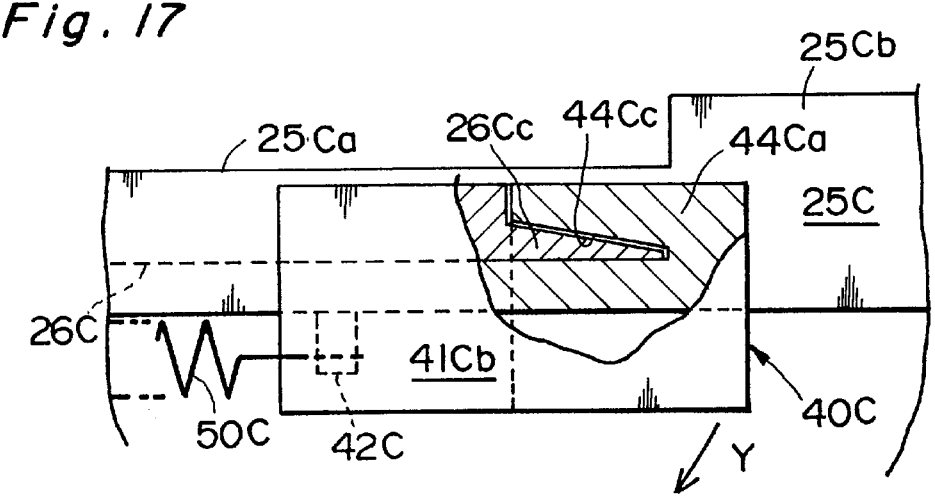
FIG. 17 is a main-part plan view of a state in which the slider of FIG. 16 is assembled to the half-shell on the side of the lower wall.
Figure 18:
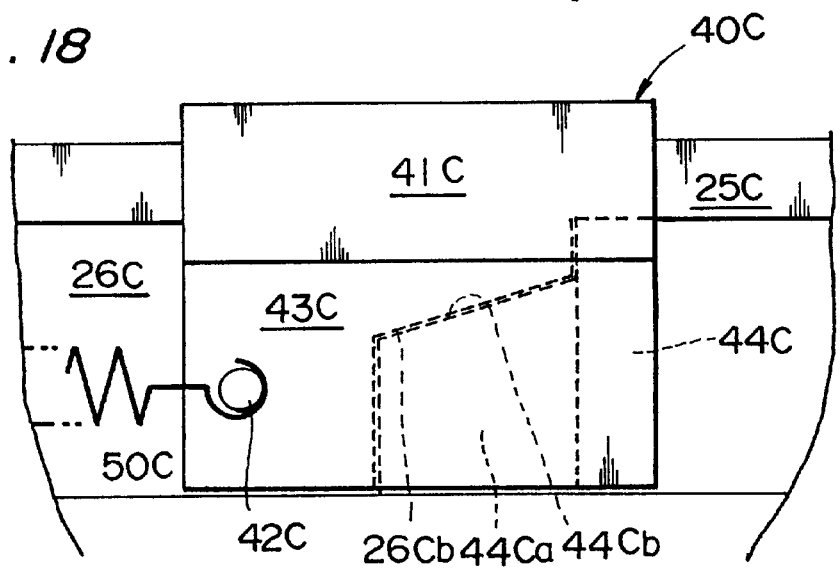
FIG. 18 is a main-part front view of the state in which the slider of FIG. 16 is assembled to the half-shell on the side of the lower wall.

Another modification of a slider and a stopper for making the installation of sliders more stable than in the above modification, is shown in FIGS. 16, 17, 18. In this modification, components or parts corresponding to those of the disk cartridge of the first embodiment are designated by the reference numerals used in the first embodiment and suffixed by an alphabetical character, "C". This modification is basically the same as the modification of FIGS. 13, 14, 15. Besides, in this modification, a cutout 44Cc is formed on a side of the positioning portion 43C of the frictional projection 44Ca. Further, in correspondence to this cutout 44Cc, a projection 26Cc is formed on an end portion of the stopper 26C.

Accordingly, also in this modification, a frictional force exerting between the frictional surfaces 26Cb and 44Cb, produces a resistance to the rotation of the slider relative to the stopper as shown in FIGS. 17 and 18.

Furthermore, the projection 26Cc of the stopper bites into the cutout 44Cc of the sliders as shown in FIG. 17.

Therefore, against the rotating force which is exerted upon the sliders in the direction of arrow Y as shown in the figure, the sliders are surely prevented from rotating by direct engagement of the projection 44Cc with the projection 26Cc. Therefore, in this modification, the sliders can be prevented from being disengaged or dislocated from the stopper almost 100%.

Figure 22:
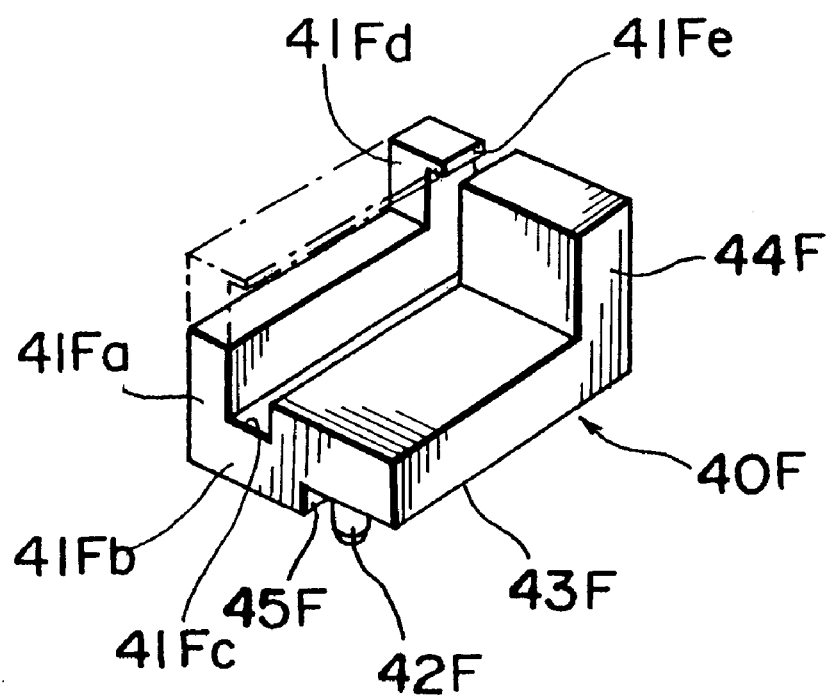
FIG. 22 is a perspective view of another modification of the engaging pin which is provided on the slider of the first embodiment.
Figure 23:
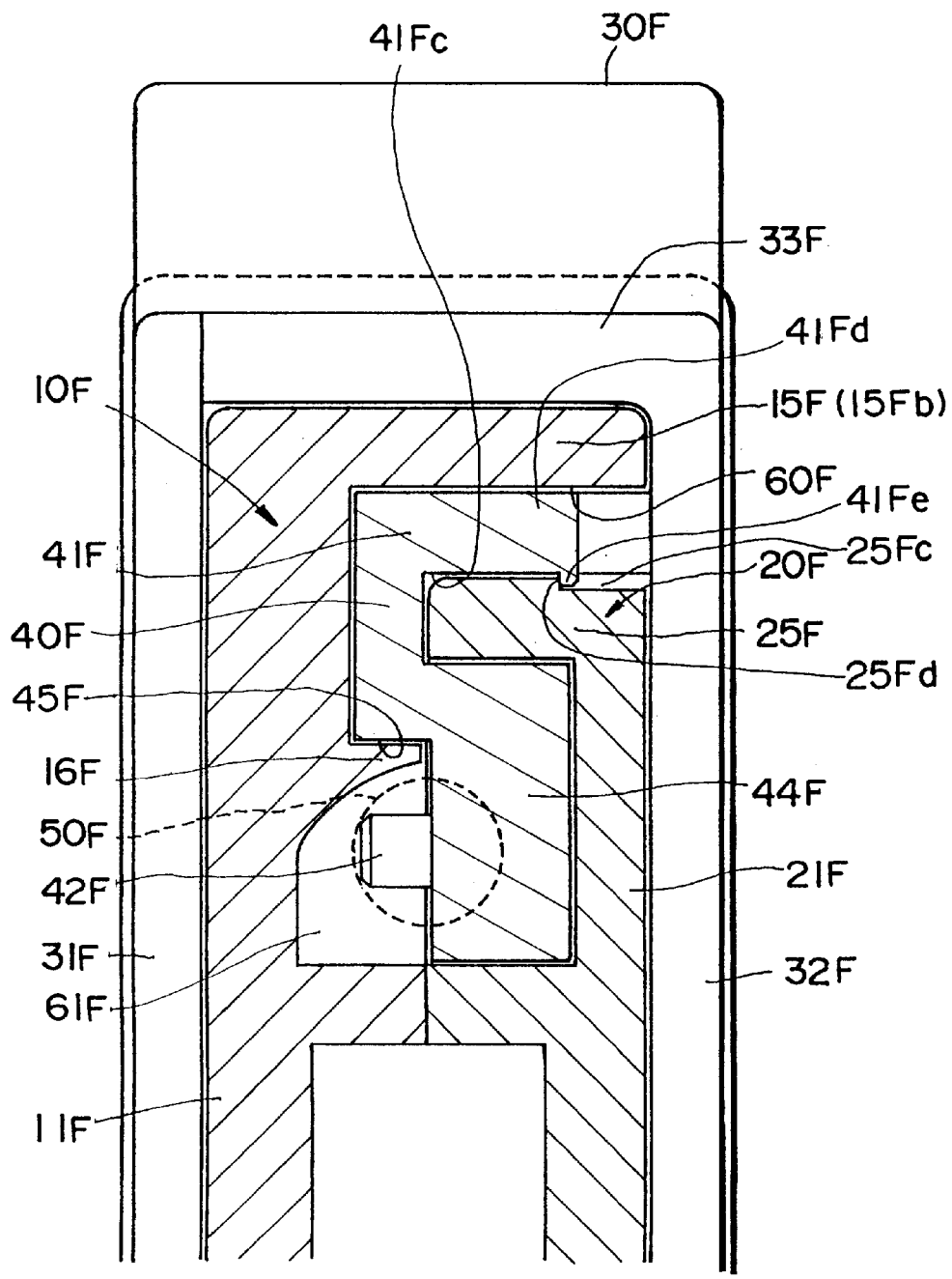
FIG. 23 is a sectional view of another modification, of FIG. 7, in which the slider of FIG. 22 is used.

FIGS. 22 and 23 show another modification of a slider and a stopper for making the installation of sliders more stable as well. In this modification, components or parts corresponding to those of the disk cartridge of the first embodiment are designated by the reference numerals used in the first embodiment and suffixed by an alphabetical character, "F".

A characteristic of the slider of the modification is that there is provided an upper wall extension 41Fd formed by extending a part of the upper wall 41Fa and that an engaging claw 41Fe is formed from this upper wall extension 41Fd. In correspondence to this engaging claw 41Fe, a groove 25Fc is formed on the upper surface of the upper-end wall 25F of the lower wall side half-shell 20F. As apparent from FIG. 23, in the state that the sliders 40F, 40F are assembled to the lower wall side half-shell 20F, the upper wall extension 41Fd extends on the upper-end wall 25F, and the engaging claw 41Fe slidably engages the groove 25Fc. Accordingly, the slider of this arrangement, once mounted on the upper-end wall 25F, is not easily dislocated or disengaged from the upper-end wall 25F.

The mounting of the sliders onto the upper-end wall is forcedly carried out from the left side in FIG. 23. In this mounting work, the upper wall of the sliders and the extension 41Fd thereof are flexed upward, so that the sliders can be fitted onto the upper-end wall 25F without problem.

Although the upper wall extension 41Fd is an extension of part of the upper wall 41Fa, it may otherwise be formed by extending the entire upper wall 41Fa as indicated by an imaginary line as shown in FIG. 22.

Alternatively, the modification shown in FIGS. 22 and 23 may be used in combination with the modifications described above and shown in FIGS. 13, 14, 15, 16, 17 and 18.

Figure 20:
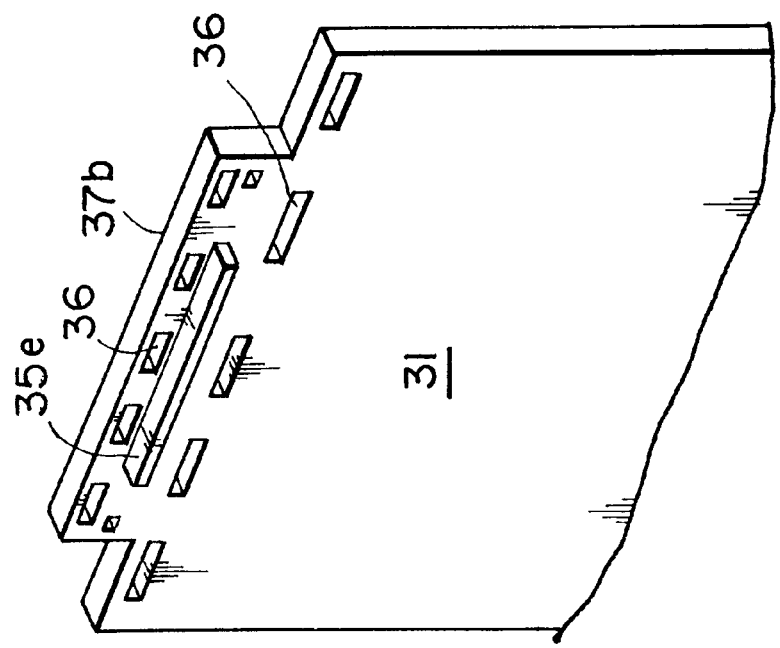
FIG. 20 is a main-part perspective view of a shutter plate on the side of the lower wall.
Figure 19:
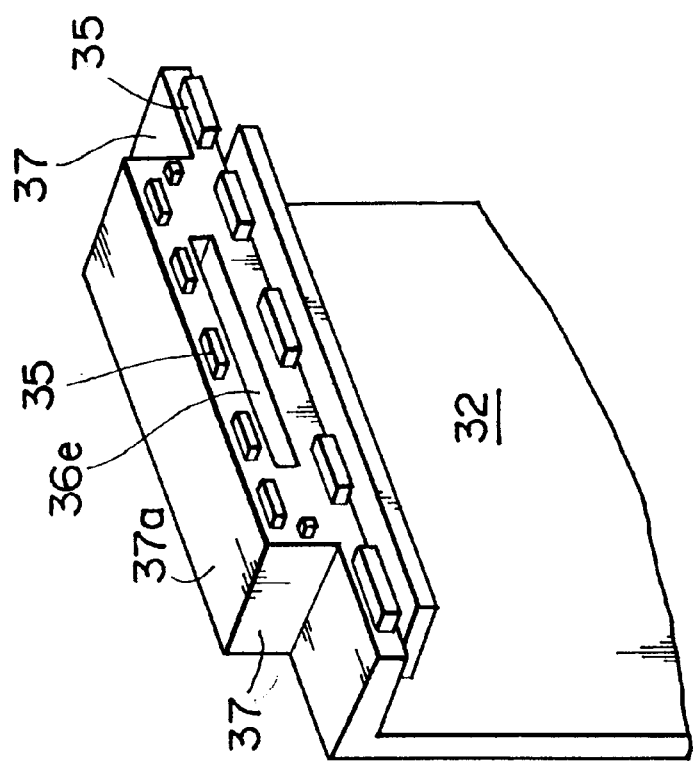
FIG. 19 is a main-part perspective view of a shutter plate on the side of the upper wall.

Next, a concrete example of the structure for positioning the two shutter plates 31, 32 relative to each other and for welding them to each other is described below with reference to FIGS. 19 and 20.

In the example of FIG. 1, a narrow positioning recess 36e which is open toward the inner surface is formed in the center of a projecting portion 37a between the two recessed portions 37, 37 of the lower wall side shutter plate 32, while a plurality of large and small welding projections 35 are formed around the positioning recess 36 with a good balance. On the other hand, the upper wall side shutter plate 31 has a plurality of recessed portions 36 which correspond to the projections 35 of the lower wall side shutter plate 32, while a positioning projection 35e corresponding to the positioning recess 36e is projected in the center of a projecting portion 37b which corresponds to the projecting portion 37a of the lower wall side shutter plate 32. When the two shutter plates 31, 32 are connected to each other, the positioning projection 35e is inserted into the positioning recess 36e, while the welding projections 35 are inserted into the welding recessed portions 36. With the construction, the two shutter plates 31 and 32 are stably positioned relative to each other. Subsequently, the welding projections 35 and the welding recessed portions 36 are integrated by ultrasonic welding or other means. The mutually engaging portions of the positioning projection 35e and the positioning recess 36e may also be welded to each other at the same time.

By the way, the present invention is not limited to the first embodiment and its modifications described above, and may be embodied in other various ways.

For example, it is possible that the projecting part 34 of the shutter 30 is formed slightly (e.g., about 1 to 2 mm) wider than the width of the stopper 26 so that only one of the sliders 40, 40 contacts the stopper 26 at the neutral position. In this arrangement, although the shutter 30 is slightly shifted to right or left at the neutral position, there will not arise any problem substantially if the shift is within about 1 to 2 mm.

Next, a disk cartridge according to the second embodiment is described below with reference to FIGS. 24 to 33.

The disk cartridge illustrated in the figures, also has a quadrangular, thin-plate-shaped, hollow cartridge case in which a digital video disk 101 (DVD) is rotatably housed as a disk-shaped recording medium. The cartridge case is also so constructed that a half-shell on a side of an upper wall (hereinafter also referred to as an "upper wall side half-shell" (side A)), and a half-shell on a side of a lower wall (hereinafter also referred to as a "lower wall side half-shell" (side B)), which are both plastic molded and equal in thickness to each other, are overlaid on each other.

Figure 24:
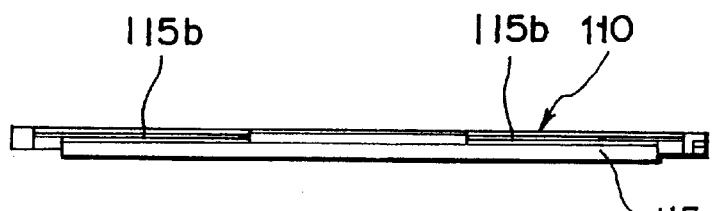
FIG. 24 is a plan view showing a half-shell on a side of an upper wall of a disk cartridge according to a second embodiment of the present invention.
Figure 25:
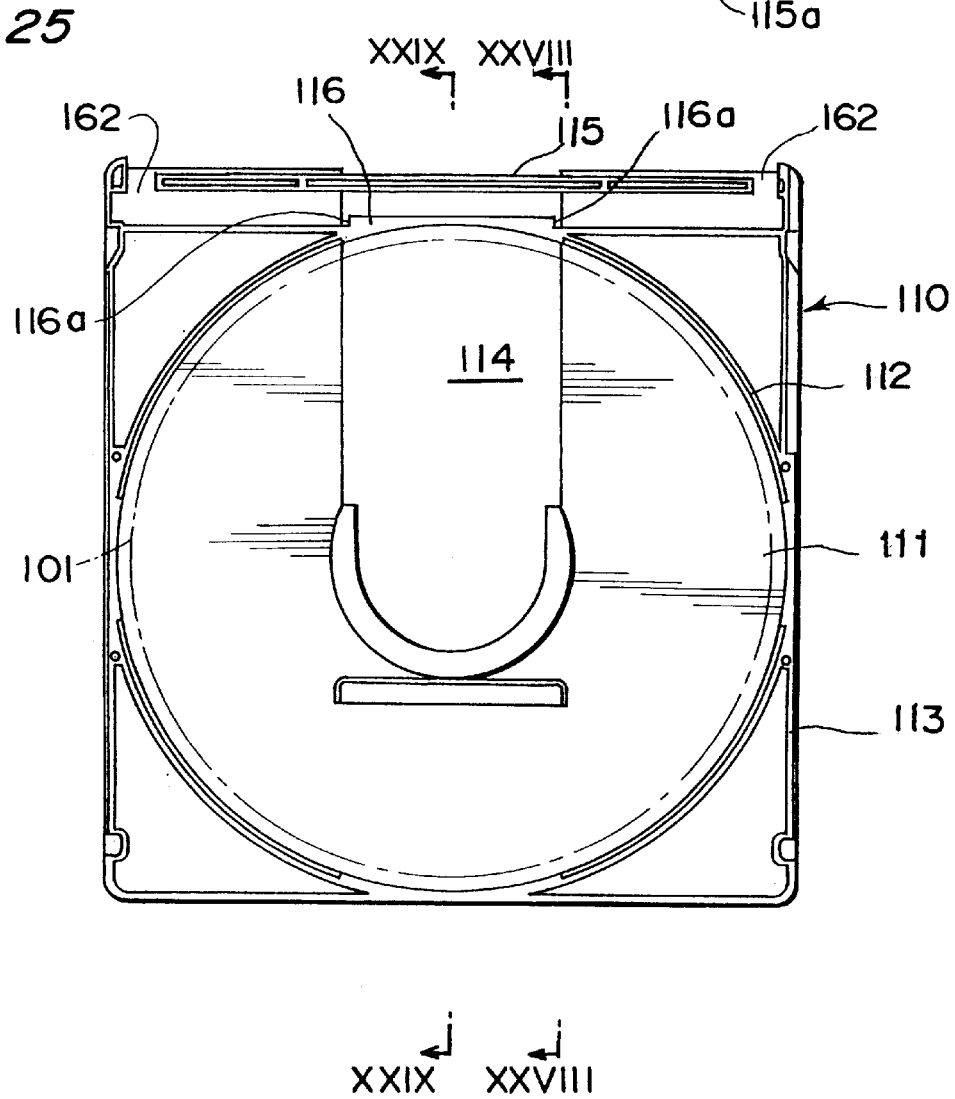
FIG. 25 is an inside view of the half-shell shown in FIG. 24.
Figure 26:
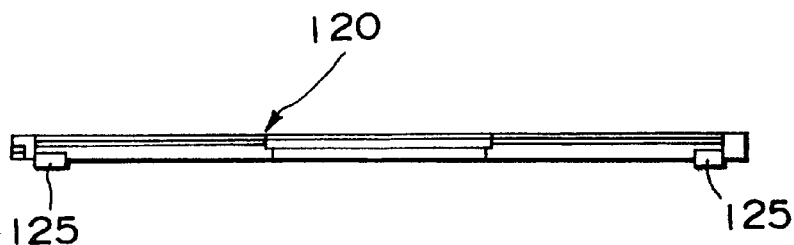
FIG. 26 is a plan view showing a half-shell on a side of a lower wall of the disk cartridge according to the second embodiment.
Figure 27:
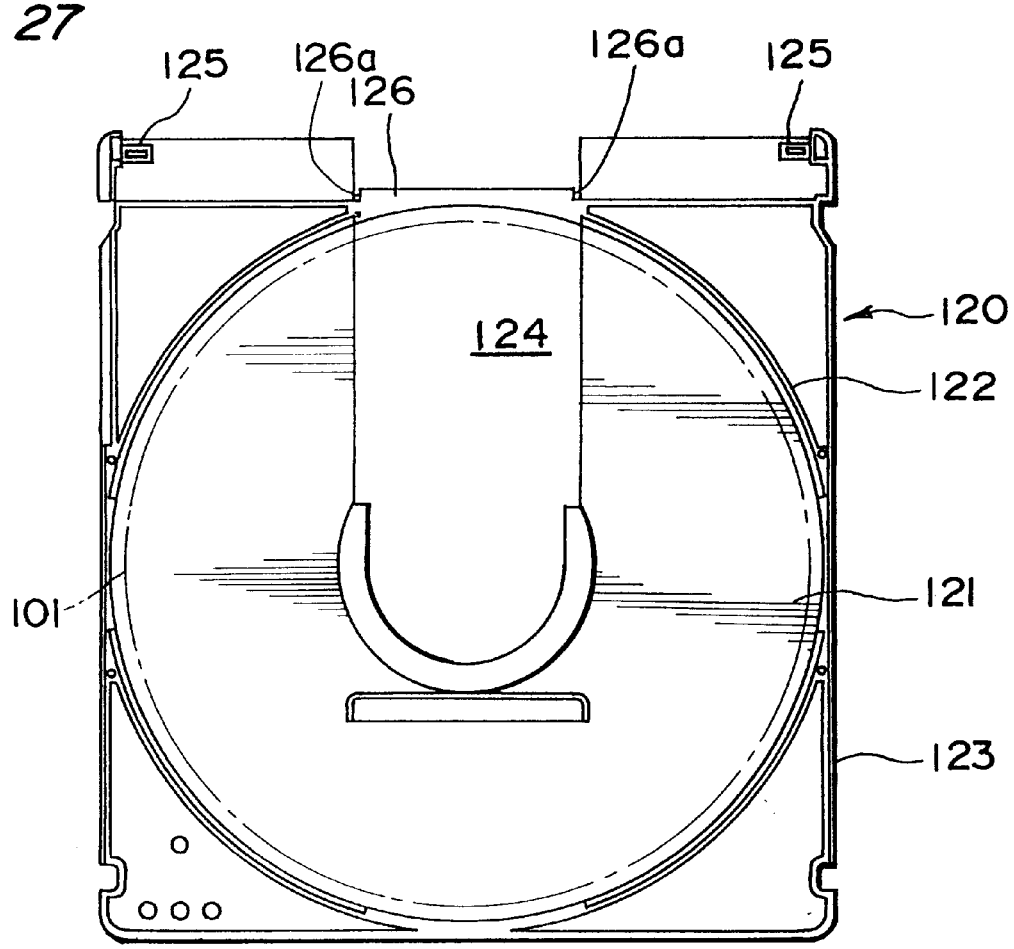
FIG. 27 is an inside view of the half-shell shown in FIG. 26.

FIG. 24 is a plan view showing the half-shell on the side of the upper wall of the disk cartridge according to the second embodiment of the present invention; FIG. 25 is an inside view of the half-shell shown in FIG. 24; FIG. 26 is a plan view showing the half-shell on the side of the lower wall of the disk cartridge according to the second embodiment; and FIG. 27 is an inside view of the half-shell shown in FIG. 26. The two shells 110, 120 are basically of the same construction, except a guide rail part for sliding the shutter which is described below.

Peripheral walls 112, 122 defining a disk-housing space, and side walls 113, 123 extending along side edge portions of an upper wall 111 and a lower wall 121, are formed integrally with the upper wall side half-shell 110 and the lower wall side half-shell 120, respectively. The two shells 110, 120 are provided with head access openings 114, 124 which forms in a direction in which the disk cartridge is loaded to a disk drive (not shown) upward from the central portions of the upper wall 111 and the lower wall 121. These openings 114, 124 are covered with the shutter 130 (see FIGS. 28 and 29), and the shutter 130 is adapted to be slid to both right and left from a neutral position where the shutter 130 covers the openings 114, 124.

Figure 28:
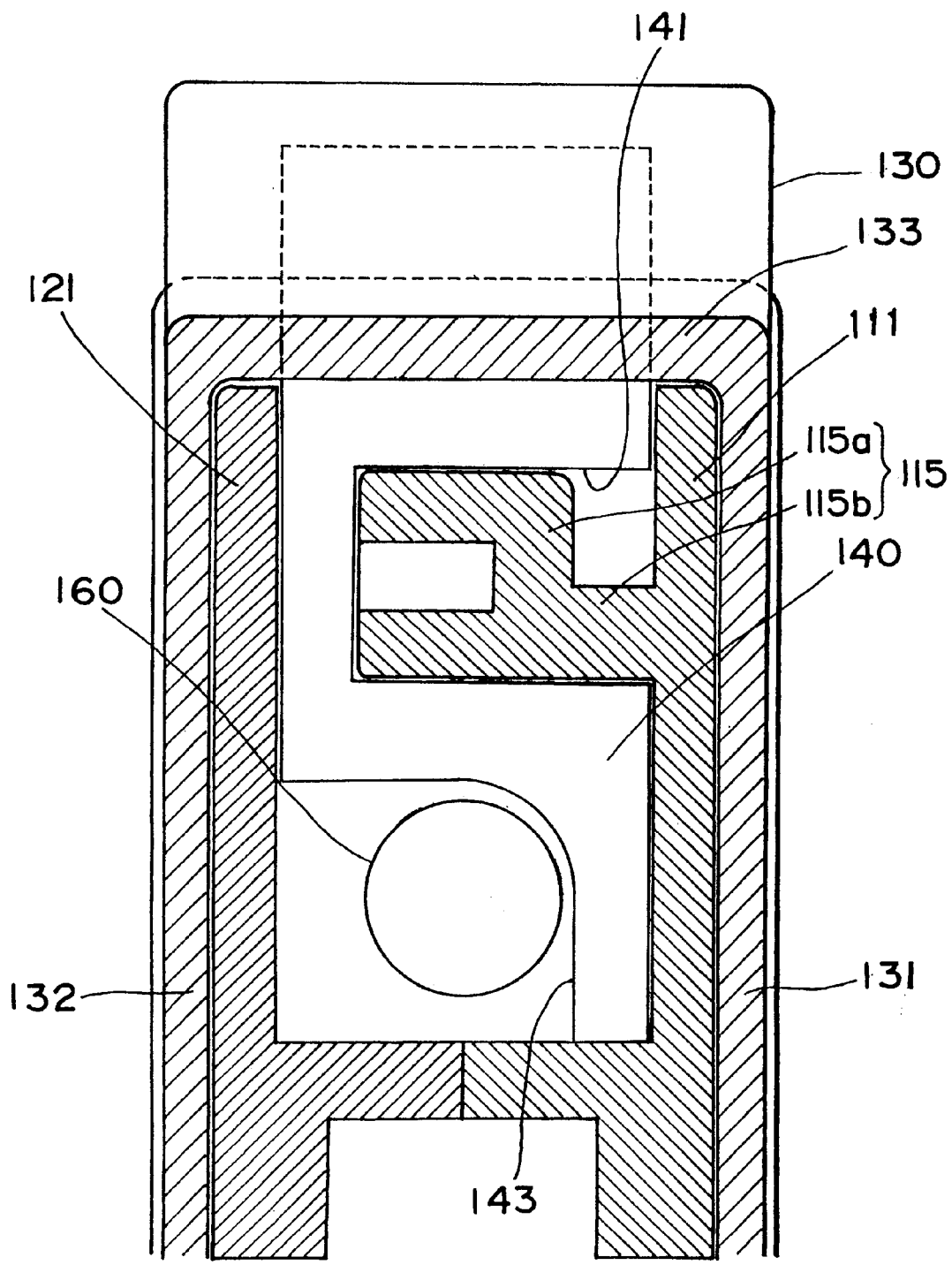
FIG. 28 is a sectional view taken along the line XXVIII—XXVIII of FIG. 25 in a state in which the half-shell on the side of the upper wall shown in FIGS. 24 and 25, the half-shell on the side of the lower wall shown in FIGS. 26 and 27, and a shutter mechanism are assembled together.
Figure 29:
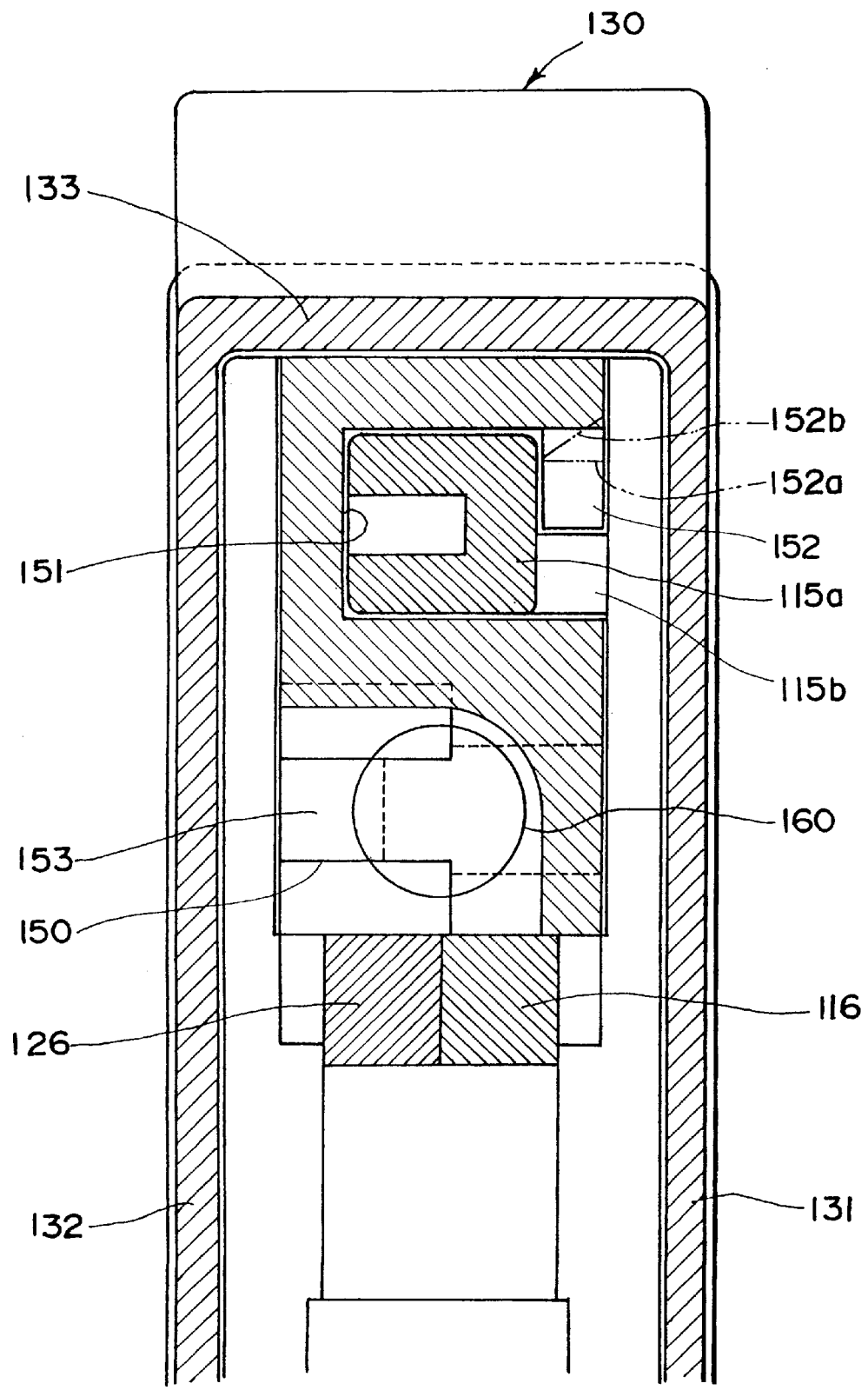
FIG. 29 is a sectional view taken along the line XXIX—XXIX of FIG. 25 in a state in which the half-shell on the side of the upper wall shown in FIGS. 24 and 25, the half-shell on the side of the lower wall shown in FIGS. 26 and 27, and the shutter mechanism are assembled together.

FIG. 28 is a sectional view taken along the line XXVIII—XXVIII of FIG. 25 in a state in which the half-shell on the side of the upper wall shown in FIGS. 24 and 25, the half-shell on the side of the lower wall shown in FIGS. 26 and 27, and a shutter mechanism are assembled together; and FIG. 29 is a sectional view taken along the line XXIX—XXIX of FIG. 25 in a state in which the half-shell on the side of the upper wall shown in FIGS. 24 and 25, the half-shell on the side of the lower wall shown in FIGS. 26 and 27, and the shutter mechanism are assembled together.

In FIGS. 28 and 29, a reference numeral 115 denotes a guide rail which is provided on the upper-wall side half-shell 110; 140 denotes an inner slider; and 150 denotes an outer slider. There are provided a pair of outer sliders 150, and the pair of outer sliders 150 are connected to each other by a spring 160 so as to be attracted to each other, as will be described later.

The guide rail 115, which is formed integrally with an inner-surface upper end portion of the upper wall 111, comprises a rail part 115a having a square cross section and extending along one side of the cartridge case, and a leg part 115b connecting to the rail part 115a and the inner surface of the upper wall 111. The leg part 115b is formed only on a right side and a left side of the head access opening 114, while the rail part 115a of the guide rail 115 is arranged on a center line in a direction of thickness of the cartridge case as shown in FIGS. 28 and 29, the thickness of the rail part 115a being equal to or less than that of the disk-shaped recording medium (not shown). With the construction, the guide rail 115 does not disturb or interfere the running of the head which gains access to the disk therein when the disk drive is loaded with the disk cartridge.

By the way, the rail part 115a of the guide rail 115 is slightly shorter than the interval between the two side walls 113, 113 of the upper-wall side half-shell 110, thus forming spaces or gaps 162, 162 between both ends of the rail part 115a and both side walls 113 of the upper-wall side half-shell 110. On the other hand, in the lower-wall side half-shell 120, a retention part 125 constituting an extension of the guide rail 115 is formed integrally with upper end portions of both side walls 123, 123 so that when the two shells 110, 120 are connected to each other, the guide rail 115 becomes continuous between both the side walls of the cartridge case.

Reference numerals 116 and 126 denote support members for the inner slider 140, in which the support members extend in parallel with the guide rail 115, where the rail part 115a of the guide rail 115 and these support members 116, 126 only cross the head access openings 114, 124. Both end portions of the upper surfaces of these support members 116, 126 are formed into steps 116a, 116a and 126a, 126a, as shown in FIGS. 25 and 27, so as to functions as stoppers for the outer sliders 150, 150.

The shutter 130 is made of plastics and formed into a U-shape in cross section. The shutter 130 is constituted, in a square-shape in cross section, by a shutter plate 131 for closing the opening 114 of the upper wall 111, a shutter plate 132 for closing the opening 124 of the lower wall 121, and a connecting plate 133 which connect the two shutter plates 131, 132 to each other. The shutter is provided so as to sandwich the upper wall 111 and the lower wall 121 from outside.

On the inner surface of the connecting plate 133 of the shutter 130, is provided the inner slider 140 which slidably engages the guide rail 115. The inner slider 140 has a groove 141 inside which the guide rail 115 are mounted when the inner slider 140 gains access to the guide rail 115 perpendicularly toward the upper wall 111. After the inner slider 140 is mounted onto the guide rail 115, the shutter 130 can be fixed to the inner slider 140 by screwing, ultrasonic welding, or other optional means.

Figure 32:
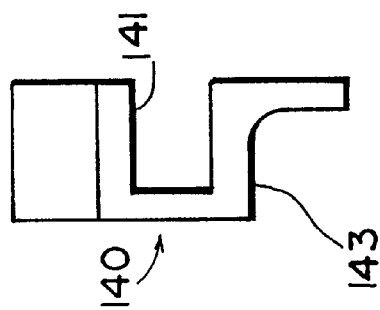
FIG. 32 is a side view of the inner slider shown in FIG. 28.
Figure 30:
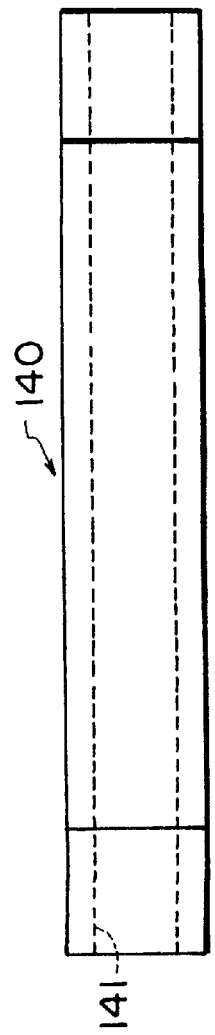
FIG. 30 is a plan view of an inner slider shown in FIG. 28.
Figure 31:
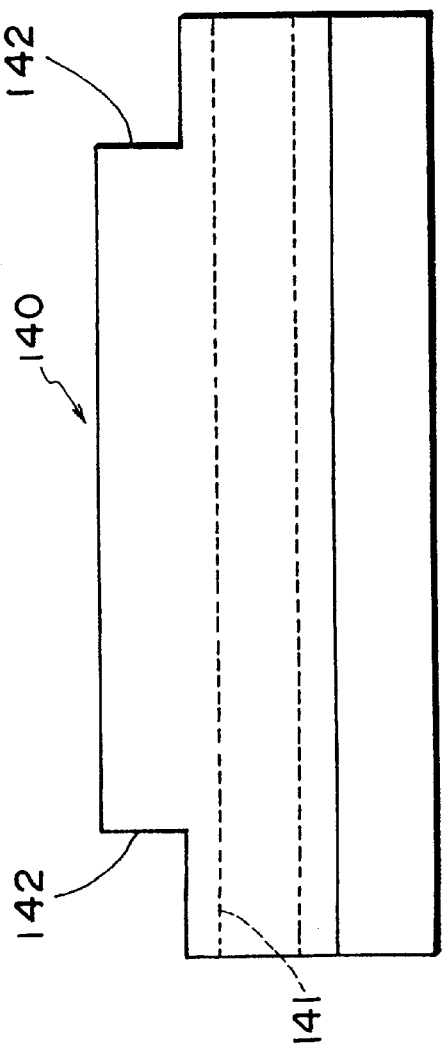
FIG. 31 is a front view of the inner slider shown in FIG. 28.

The inner slider 140 is shown in FIGS. 30, 31 and 32, where FIG. 30 is a plan view of the slider 140, FIG. 31 is a front view thereof, and FIG. 32 is a side view thereof. This inner slider 140 exhibits a protruding shape as viewed from the front, and has recessed portions 142, 142 on both right and left shoulder portions thereof.

In correspondence to these recessed portions 142, 142, the shutter 130 also has recessed portions on right and left shoulder portions although they are not shown in the figures, and the shutter 130 is so shaped that its central portion is protruded. By the way, the recessed portions on both shoulders of the shutter 130 are used in such a way that the shutter 130 is opened by hooking it with a shutter drive pin of the disk drive system when the disk cartridge is loaded to the disk drive.

Figure 33:
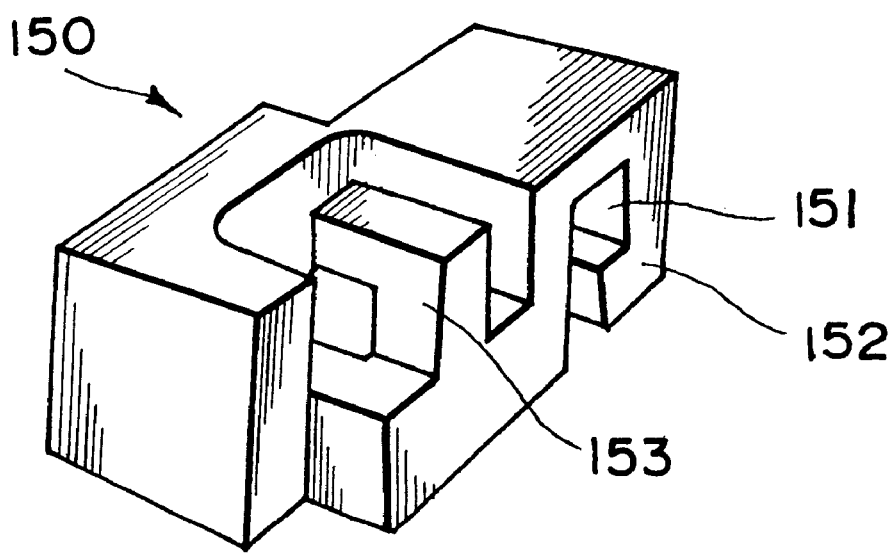
FIG. 33 is a perspective view of an outer slider shown in FIG. 29.

The pair of the outer sliders 150, 150 are slidably mounted onto the guide rail 115 so as to sandwich the inner slider 140 from both sides. One of these outer sliders 150, 150 is shown in FIG. 33. The outer slider 150 has an engaging recess 151 for being axially inserted relative to the guide rail 115. Each of the outer slider 150 is inserted into the rail part 115a from the spaces 162, 162 formed between both ends of the rail part 115a of the guide rail 115 and both side walls 113 of the upper-wall side half-shell 111.

The engaging recess 151 of the outer slider 150 is formed or defined by a hook-shaped part 152. Also, each outer slider 150 is provided with a hook 153 on a surface thereof confronting the inner slider 140. The outer sliders 150 are formed symmetrical relative to the inner slider 140.

The hooks 153, 153 of the two outer sliders 150, 150 support a tension coil spring 160 therebetween, so that the two outer sliders 150, 150 are attracted to each other. The tension coil spring 160 extends or exists, inside a recessed portion 143 formed on a front-face lower end side of the inner slider 140, between the two outer sliders 150, 150. Thus, in a state that the two outer sliders 150, 150 are in contact with the stoppers 116a, 126a of the upper surfaces of the support members 116, 126 of the cartridge case, the inner slider 140 is positioned relative to the supporting members 116, 126, where the shutter 130 comes to the neutral position so that the head access openings 114, 124 are closed by the shutter 130.

In the above arrangement, the disk cartridge can be assembled through the following steps of:
  mounting the inner slider 140 onto the guide rail 115;
  inserting the outer sliders 150, 150 from both ends of the guide rail 115;
  mounting the tension coil spring 160 between the pair of outer sliders 150, 150;
  connecting both shells 110, 120 to each other with the disk-shaped recording medium 101 being sandwiched therebetween; and
  fixing the shutter 130 to the inner slider 140.

With the disk cartridge assembled in this way, the pair of outer sliders 150, 150 contact with the inner slider 140, fixed to the shutter 130, from both right and left sides thereof, while the two outer sliders 150, 150 are positioned by the steps i.e. the stoppers 116a, 126a of the supporting portions 116, 126, with the inner slider 140 being positioned in the center of the guide rail 115. With the state, the shutter 130 comes to the neutral position, causing the head access openings 114, 124 to be closed by the shutter 130.

According to the above mechanism, there is no need of arranging the shutter mechanism as a subassembly beforehand, and the components and parts can be easily assembled to the shells 110, 120. Therefore, it is easy to carry out the work to assemble the disk cartridge.

Also, only one spring 160 is used, and no additional metallic parts are used. Therefore, it is possible to reduce the cost of production of the disk cartridge and to make the disk cartridge lightweight.

By the way, with the arrangement that the rail part 115a of the guide rail 115 is formed square-shaped or quadrangle-shaped in cross section, the guide rail 115 functions as a stopper for preventing the rotation of the inner slider 140 and for preventing the rotation of the outer sliders 150, 150, relative to the guide rail 115. Thus, with the arrangement, there is no need of providing any special means for preventing the rotation therebetween.

Meanwhile, when the shutter 130 is slid in either direction of right or left relative to the cartridge case from the neutral position, the inner slider 140 moves together with the shutter 130 in the corresponding direction while the inner slider 140 is pushing one of the outer sliders 150, 150. During the movement thereof, the other of the outer sliders 150, 150 is kept stationary in position by the stoppers 116a, 116a; 126a, 126a so that the tension coil spring 160 is stretched between the pair of outer sliders 150, 150. As a result, the two outer sliders 150, 150 are attracted to each other by the biasing force of the tension coil spring 160, and the shutter 130 is returned to the neutral position by the biasing force thereof from the position at which the shutter opens the head access opening of the cartridge case, when the force to keep the shutter at the same position is released.

The present invention is not limited to the above second embodiment, and may be embodied in other various modifications. For instance, instead of forming the retention part 125, constituting an extension of the guide rail 115, on the lower wall side half-shell 120, for example, it is also possible to form a recessed portion on one of the contact surface of the inner slider 140 and the contact surface of the outer sliders 150, 150, and to form a protruding portion (projection portion) on the other of the contact surface of the inner slider 140 and the contact surface of the outer sliders 150, 150 in which the recessed portion and the protruding portion, as engaging means, engage each other when the inner slider 140 and the outer slider 150 contact each other.

With this arrangement, as the above embodiment in which the retention part 125 is provided as an extension of the guide rail 115, the outer slider 150 is prevented from disengaging or dislocating from the guide rail 115 when the shutter 130 is opened and the outer slider 150 is slid up to such a position at which the outer slider 150 may possibly disengage from the guide rail 115.

Also, for example, in order to be able to mount the outer slider 150 onto the rail part 115a of the guide rail 115 in a direction which is perpendicular to the direction in which the guide rail extends, instead of mounting the outer slider 150 onto the rail part 115a thereof in the axial direction in which the guide rail extends, a tip part (tip end portion) of the elastic hook-shaped part 152, defining the engaging recess portion 151, of the outer slider 150 may be formed shorter as indicated by an imaginary line 152a in FIG. 29.

With this arrangement, the mounting of the outer sliders 150, 150 to the guide rail 115 can be easily achieved without providing the spaces 162, 162 between the side walls 113, 113 of the cartridge case and the sides of the guide rail 115.

Furthermore, if the tip end portion of the hook-shaped part 152 is formed as a guide sloping surface as indicated by an imaginary line 152b in the same figure, the efficiency to mount the outer slider 150 onto the rail part 115a of the guide rail 115 is further enhanced.

Also, the inner slider 140 may form so as to have a width which is slightly (e.g., about 1 to 2 mm) wider than a width of gap or spacing between the two stoppers 116a, 126a; 116a, 126a of the support members 116, 126 so that only one of the outer sliders 150, 150 contacts one of the stoppers 116a, 126a at the neutral position. With this construction, the shutter 130 may be slightly shifted in the right or left when the shutter is located at the neutral position; however, if the shift is within about 1 to 2 mm, no special problem will arise.

Although the present invention has been fully described in connection with the preferred embodiments thereof with reference to the accompanying drawings, it is to be noted that various other changes and modifications are apparent to those skilled in the art. Such changes and modifications are to be understood as included within the scope of the present invention as defined by the appended claims unless they depart therefrom.

What is claimed is:

1. A method for assembling a disk cartridge which includes:

a cartridge case which has an upper half-shell with an upper wall and a lower half-shell with a lower wall in which the cartridge case has a head access opening;

a disk-shaped recording medium which is rotatably housed inside the cartridge case;

a shutter which is slidable relative to the cartridge case in a sliding direction from right to left relative thereto with a neutral position therebetween corresponding to a position at which the shutter closes the head access opening;

guide means which is defined by a part of the cartridge case in the sliding direction;

a first slider which is fixed to the shutter and which is guided by the guide means; and biasing means which exerts a biasing force upon the first slider so as to return the shutter to the neutral position when the shutter is moved to one of the right and left from the neutral position, wherein the biasing means comprises:

a pair of second sliders which are guided by the guide means, wherein one of the second sliders is arranged on one of a pair of sides of the first slider, and wherein the other of the second sliders is arranged on the other thereof of the first slider;

spring means which attracts the pair of second sliders to each other; and a stopper, provided on the cartridge case, which has a pair of ends, wherein one of the ends is able to abut an inner surface of one of the second sliders, and wherein the other of the ends is able to abut an inner surface of the other of the second sliders from inside, and wherein the guide means comprises a first guide groove which a part of the upper wall and a part of the lower wall cooperate to form therebetween, and wherein the first slider comprises a projecting part which is slidable inside the first guide groove, and wherein the second slider slidably engages the first guide groove, and wherein the shutter comprises an upper shutter plate and a lower shutter plate, in which the upper shutter plate and the lower shutter plate are divided at a location where the upper shutter plate and the lower shutter plate are connected to each other, the method comprising the steps of:

mounting one of the upper shutter plate of the shutter and the lower shutter plate thereof on the lower half-shell generally in a direction of thickness of the lower half-shell so that the projecting part of the first slider which is fixed to the shutter engages the first guide groove;

mounting the pair of second sliders on the lower half-shell generally in the direction of thickness of the lower half-shell so that the pair of second sliders engage the first guide groove, and then connecting the pair of second sliders by the spring means;

connecting the upper half-shell to the lower half-shell; and connecting the one of the upper shutter plate and the lower shutter plate to the other thereof.

2. The method as claimed in claim 1, wherein the projecting part of the first slider comprises a first projecting part and a second projecting part that is separate from the first projecting part, in which the first projecting part is formed on one of a pair of sides of the shutter in the sliding direction, and in which the second projecting part is formed on the other of the pair of sides of the shutter in the sliding direction.

3. The method as claimed in claim 1, wherein one of the upper wall and the lower wall comprises a projecting portion on an inner side thereof in which the projecting portion is formed in parallel with the first guide groove, and wherein the second slider comprises a sliding surface which is slidable relative to the projecting portion.

4. The method as claimed in claim 1, wherein the second slider comprises a wedge-like projection which projects in a direction in which the second slider contacts the stopper, while the stopper comprises a cutout portion with which the wedge-like projection of the second slider engages, wherein the wedge-like projection and the cutout portion comprise complementary frictional surfaces which contact with each other, and wherein the complementary frictional surfaces contact each other with the complementary frictional surfaces being pressed with each other when the second slider contacts the stopper under a biasing force exerted by the spring means.

5. The method as claimed in claim 4, wherein the second slider further comprises a wedge-like groove which is formed tapering between a body of the second slider and the wedge-like projection, in which a surface that forms the wedge-like groove is formed generally in the sliding direction and is formed so as to be tapered in a direction opposite the stopper, while the stopper comprises a wedge-like part which is complementary with the wedge-like groove, and wherein the surface of the wedge-like groove and a surface of the wedge-like part contact each other when the second slider contacts the stopper under the biasing force exerted by the spring means.

6. The method as claimed in claim 1, wherein part of the lower wall comprises a plank-like wall which has a projecting part that projects inside and which has a second guide groove on a side opposite a side on which the plank-like wall projects, in which the second guide groove exists in the sliding direction, wherein the second slider has a groove inside which the projecting part of the plank-like wall is slidably mounted, and wherein the second slider has a claw which projects inside the groove thereof and which slidably engages the second guide groove of the plank-like wall.

7. The method as claimed in claim 1, wherein one of the upper wall and the lower wall comprises a second guide groove which exists in parallel with the first guide groove and which exists opposite the first guide groove relative to the one of the upper wall and the lower wall, and wherein one of the upper shutter plate and the lower shutter plate, which corresponds to the one of the upper wall and the lower wall, comprises a projecting portion which slidably engages the second guide groove.

8. A method for assembling a disk cartridge which includes:

a cartridge case which has an upper half-shell with an upper wall and a lower half-shell with a lower wall in which the cartridge case has a head access opening;

a disk-shaped recording medium which is rotatably housed inside the cartridge case;

a shutter which is slidable relative to the cartridge case in a sliding direction from right to left relative thereto with a neutral position therebetween corresponding to a position at which the shutter closes the head access opening;

guide means which is defined by a part of the cartridge case in the sliding direction;

a first slider which is fixed to the shutter and which is guided by the guide means; and biasing means which exerts a biasing force upon the first slider so as to return the shutter to the neutral position when the shutter is moved to one of the right and left from the neutral position, wherein the guide means comprises a guide groove which a part of the upper wall and a part of the lower wall cooperate to form therebetween, wherein the first slider comprises a projecting part which is slidable inside the guide groove, and wherein the shutter comprises an upper shutter plate and a lower shutter plate, in which the upper shutter plate and the lower shutter plate are divided at a location where the upper shutter plate and the lower shutter plate are connected to each other, the method comprising the steps of:

mounting one of the upper shutter plate of the shutter and the lower shutter plate thereof on the lower half-shell generally in a direction of thickness of the lower half-shell so that the projecting part of the first slider which is fixed to the shutter engages the guide groove;

connecting the upper half-shell to the lower half-shell; and connecting the one of the upper shutter plate and the lower shutter plate to the other thereof.

9. A method for assembling a disk cartridge which includes:

a cartridge case which has an upper half-shell with an upper wall and a lower half-shell with a lower wall in which the cartridge case has a head access opening;

a disk-shaped recording medium which is rotatably housed inside the cartridge case;

a shutter which is slidable relative to the cartridge case in a sliding direction from right to left relative thereto with a neutral position therebetween corresponding to a position at which the shutter closes the head access opening;

guide means which is defined by a part of the cartridge case in the sliding direction;

a first slider which is guided by the guide means; and biasing means which exerts a biasing force upon the first slider so as to return the shutter to the neutral position when the shutter is moved to one of the right and left from the neutral position, wherein the biasing means further comprises:

a pair of second sliders which are guided by the guide means, wherein one of the second sliders is arranged on one of a pair of sides of the first slider, and wherein the other of the second sliders is arranged on the other thereof of the first slider;

spring means which attracts the pair of second sliders to each other; and a stopper, provided on the cartridge case, which has a pair of ends, wherein one of the ends is able to abut an inner surface of one of the second sliders, and wherein the other of the ends is able to abut an inner surface of the other of the second sliders from inside, wherein the guide means comprises a guide rail which is integrated with an inner surface of one of the upper wall and the lower wall in the sliding direction, wherein the first slider slidably engages the guide rail, and wherein the second slider slidably engages the guide rail, the method comprising the steps of:

mounting the first slider on the guide rail generally in a direction of thickness of the one of the upper wall and the lower wall;

mounting the pair of second sliders on the guide rail, and then connecting the pair of second sliders by the spring means;

connecting the upper half-shell and the lower half-shell to each other; and fixing the shutter to the first slider.

10. The method as claimed in claim 9, wherein the guide rail comprises:

a rail part; and a leg part which connects the rail part with the inner surface of the one of the upper wall and the lower wall, wherein the rail part is generally provided at a location which corresponds to a center line with respect to a direction of thickness of the cartridge case, in which the rail part has a thickness that is equal to or less than a thickness of the disk-shaped recording medium, and wherein the leg part is provided at a location outside the head access opening of the cartridge case.

11. The method as claimed in claim 10, wherein the rail part of the guide rail has a square cross section.

12. The method as claimed in claim 9, wherein there is formed a space between one of a pair of ends of the guide rail and one of a pair of sides, of the cartridge case, extending in a direction perpendicular to the sliding direction, in which one of the second sliders can pass the space, and wherein there is formed a space between the other of the pair of ends of the guide rail and the other of the pair of sides, of the cartridge case, extending in the direction perpendicular to the sliding direction, in which the other of the second sliders can pass the space, and wherein the second slider has an engaging part which allows the second slider to be mounted on the guide rail in the sliding direction.

13. The method as claimed in claim 12, wherein there is further provided a retention part which is formed on an inner surface of the other of the upper wall and the lower wall in which the retention part constitutes an extension of the guide rail that corresponds to the space therebetween.

14. The method as claimed in claim 12, wherein there is further provided engaging means which makes the first slider and the second slider engage each other with the first slider and the second slider contacting each other.

15. The method as claimed in claim 14, wherein the engaging means comprises:

a concave part which is provided on a contacting surface of one of the first slider and the second slider, and a convex part, able to engage the concave part, which is provided on a contacting surface of the other of the first slider and the second slider.

16. The method as claimed in claim 9 wherein the second slider has an engaging concave part which allows the second slider to be mounted on the guide rail in a direction perpendicular to the sliding direction, and wherein the engaging concave part is defined inside an elastic hook-shaped part which is a part of the second slider.

17. The method as claimed in claim 16, wherein the elastic hook-shaped part comprises a tip part which has a guide sloping surface for assisting to mount the second slider onto a rail part of the guide rail.

* * * * *